(12) United States Patent
Rapaka et al.

(10) Patent No.: US 9,578,328 B2
(45) Date of Patent: Feb. 21, 2017

(54) CROSS-LAYER PARALLEL PROCESSING AND OFFSET DELAY PARAMETERS FOR VIDEO CODING

(71) Applicant: QUALCOMM Incorporated, San Diego, CA (US)

(72) Inventors: Krishnakanth Rapaka, San Diego, CA (US); Ye-Kui Wang, San Diego, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 14/331,004

(22) Filed: Jul. 14, 2014

(65) Prior Publication Data

US 2015/0016540 A1    Jan. 15, 2015

Related U.S. Application Data

(60) Provisional application No. 61/846,570, filed on Jul. 15, 2013.

(51) Int. Cl.
*H04N 19/167* (2014.01)
*H04N 19/50* (2014.01)
(Continued)

(52) U.S. Cl.
CPC ...... *H04N 19/00569* (2013.01); *H04N 19/105* (2014.11); *H04N 19/136* (2014.11);
(Continued)

(58) Field of Classification Search
CPC ............ H04N 19/00569; H04N 19/105; H04N 19/136; H04N 19/167; H04N 19/176; H04N 19/187; H04N 19/33; H04N 19/436; H04N 19/50; H04N 19/70
(Continued)

(56) References Cited

U.S. PATENT DOCUMENTS 8,660,375 B2 * 2/2014 Lim ................ G06T 9/004
375/240.03
8,855,435 B2 * 10/2014 Lim ................ G06T 9/004
375/240.02
(Continued)

FOREIGN PATENT DOCUMENTS

WO    2014106651 A1    7/2014

OTHER PUBLICATIONS

SHVC, Scalable HEVC (SHVC) Working Draft 2, Apr. 2013.*
(Continued)

*Primary Examiner* — Shan Elahi
(74) *Attorney, Agent, or Firm* — Shumaker & Sieffert, P.A.

(57) ABSTRACT

In an example, a method of coding video data includes determining a location of a reference sample associated with a reference picture of video data based on one or more scaled offset values, where the reference picture is included in a first layer of a multi-layer bitstream and the one or more scaled offset values indicate a difference in scale between the first layer and a second, different layer. The method also includes determining a location of a collocated reference block of video data in the first layer based on the location of the reference sample, and coding a current block of video data in the second layer relative to the collocated reference block.

37 Claims, 13 Drawing Sheets

(51) Int. Cl.
| | |
|---|---|
| *H04N 19/70* | (2014.01) |
| *H04N 19/33* | (2014.01) |
| *H04N 19/436* | (2014.01) |
| *H04N 19/105* | (2014.01) |
| *H04N 19/176* | (2014.01) |
| *H04N 19/187* | (2014.01) |
| *H04N 19/136* | (2014.01) |

(52) U.S. Cl.
CPC ......... *H04N 19/176* (2014.11); *H04N 19/187* (2014.11); *H04N 19/33* (2014.11); *H04N 19/436* (2014.11); *H04N 19/70* (2014.11); *H04N 19/167* (2014.11); *H04N 19/50* (2014.11)

(58) Field of Classification Search
USPC .................................................. 375/240.24
See application file for complete search history.

(56) References Cited

U.S. PATENT DOCUMENTS

| | | | | |
|---|---|---|---|---|
| 8,917,946 | B2* | 12/2014 | Lim ......... | G06T 9/004 375/240.02 |
| 8,923,407 | B2* | 12/2014 | Sze ......... | H04N 19/70 375/240.01 |
| 2006/0114999 | A1* | 6/2006 | Han ......... | H04N 21/234327 375/240.19 |
| 2010/0020884 | A1* | 1/2010 | Pandit ........ | H04N 19/597 375/240.25 |
| 2013/0101033 | A1* | 4/2013 | Joshi ......... | H03M 7/3068 375/240.12 |
| 2013/0156097 | A1* | 6/2013 | Budagavi ...... | H04N 19/00066 375/240.02 |
| 2013/0208792 | A1* | 8/2013 | He ............ | H04N 19/00569 375/240.12 |
| 2013/0251027 | A1* | 9/2013 | Lu ............ | H04N 19/30 375/240.02 |
| 2013/0279566 | A1* | 10/2013 | Tok ........... | H04N 19/52 375/240.03 |
| 2014/0003489 | A1* | 1/2014 | Hannuksela ..... | H04N 19/70 375/240.02 |
| 2014/0064373 | A1* | 3/2014 | Le Leannec .... | H04N 19/00424 375/240.16 |
| 2014/0093180 | A1* | 4/2014 | Esenlik ....... | H04N 19/70 382/233 |
| 2014/0105293 | A1* | 4/2014 | George ........ | H04N 19/503 375/240.12 |
| 2014/0126577 | A1* | 5/2014 | Post .......... | G06F 9/5027 370/400 |
| 2014/0334557 | A1* | 11/2014 | Schierl ....... | H04N 19/91 375/240.27 |
| 2015/0016520 | A1 | 1/2015 | Rapaka et al. | |
| 2015/0304667 | A1* | 10/2015 | Suehring ...... | H04N 19/70 375/240.02 |
| 2016/0277733 | A1* | 9/2016 | Li ............ | H04N 19/593 |

OTHER PUBLICATIONS

Gao et al, Inter-layer Intra Mode Prediction for Scalable Extension of HEVC, 2013.*
HoangVan et al, Optimal Reconstruction for a HEVC Backward Compatible Distributed Scaclable Video Codec, 2010.*
Wallendael et al, Multi-loop Quality Scalability based on High Efficiency Video Coding, May 7-9, 2012.*
Won et al, Predictive coding of CU quadtree structure for HEVC quality scalability, 2013.*
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen, et al., "Scalable HEVC (SHVC) Working Draft 2", MPEG Meeting; Apr. 2013; Incheon; (Motion Picture Expert Group or ISO/IEC JTC1/SC29/WG11), No. N13570, pp. 1-65, XP030020318.
Chen, et al., "AHG10: On video parameter set for HEVC extensions," JCT-VC Meeting; MPEG Meeting; Jul. 11-20, 2012; Stockholm; (Joint Collaborative Team on Video Coding of ISO/IEC JTC1/SC29/WG11 and ITU-T SG.16); URL: http://wftp3.itu.int/av-arch-jctvc-site/, No. JCTVC-J0124, XP030112486, 15 pp.
Chen, et al., "AHG7: Parallel decoding SEI message for MV-HEVC", JCT-3V Meeting; Apr. 20-26, 2013; Incheon; (The Joint Collaborative Team on 3D Video Coding Extension Development of ISO/IEC JTC1/SC29/WG11 and ITU-T SG.16); URL: http://phenix.int-evry.fr/jct2/, No. JCT3V-D0199, XP030130863, 4 pp.
Rapaka, et al., "MV-HEVC/SHVC HLS: On signaling of offset delay parameters and tile alignment" JCT-VC Meeting; Jul. 25-Aug. 2, 2013; Vienna; (Joint Collaborative Team on Video Coding of ISO/IEC JTC1/SC29/WG11 and ITU-T SG.16); URL: http://wftp3.itu.int/av-arch-jctvc-site/, No. JCTVC-N0160, XP030114636, 5 pp.
Skupin, et al., "Inter-layer delay indication in VUI (combining aspects of JCTVC-M0200; JCT3V-D0064 and JCT3V-D0199)", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch-jctvc-site/, No. JCTVC-M0463, XP030114420, 4 pp.
Skupin, et al., "Layer decoding delay indication for SHVC and 3D/MVHEVC", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch-jctvc-site/, No. JCTVC-M0200, XP030114157, 4 pp.
Suehring, et al., "Indication of tile boundary alignment," JCT-VC Meeting; MPEG Meeting; Jan. 14-23, 2013; Geneva; (Joint Collaborative Team on Video Coding of ISO/IEC JTC1/SC29/WG11

(56) References Cited

OTHER PUBLICATIONS and ITU-T SG.16); URL: http://wftp3.itu.int/av-arch/jctvc-site/ No. JCTVC-L0197, XP030113685, 1 pp.

Tsukuba, et al., "On resampling process for outside-bounds samples", JCT-VC Meeting; Jul. 25-Aug. 2, 2013; Vienna; (Joint Collaborative Team on Video Coding of ISO/IEC JTC1/SC29/WG11 and ITU-T SG.16); URL: http://wftp3.itu.int/av-arch-jctvc-site/, No. JCTVC-N0055, XP030114484, 5 pp.

Wang, et al., "AHG9: VPS and SPS designs in HEVC 3DV and scalable extensions", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch-jctvc-site/, No. JCTVC-M0268, XP030114225, 22 pp.

Tech, et al., "MV-HEVC Draft Text 4," (Joint Collaborative Team on Video Coding of ISO/IEC JTC1/SC29/WG11 and ITU-T SG.16); Document: JCT3V-D1004_d1, Apr. 20-26, 2013, 56 pp.

Tech, et al., "3D-HEVC Test Model 4," (Joint Collaborative Team on Video Coding of ISO/IEC JTC1/SC29/WG11 and ITU-T SG.16); Document: JCT3V-D1005_v2, Apr. 20-26, 2013, 56 pp.

Chen, et al., "SHVC Test Model 2 (SHM 2)," (Joint Collaborative Team on Video Coding of ISO/IEC JTC1/SC29/WG11 and ITU-T SG.16); Document: JCTVC-M1007_v1, Apr. 18-26, 2013, 45 pp.

Chen, et al. "SHVC Working Draft 2," (Joint Collaborative Team on Video Coding of ISO/IEC JTC1/SC29/WG11 and ITU-T SG.16); Document: JCTVC-M1008_v3, Apr. 18-26, 2013, 66 pp.

Chen, et al., "Preliminary version of High efficiency video coding (HEVC) scalable extension Draft 7," (Joint Collaborative Team on Video Coding of ISO/IEC JTC1/SC29/WG11 and ITU-T SG.16); Jun.-Jul. 9, 2014, Document: JCTVC-R1080v_3, 174 pp.

International Search Report and Written Opinion from International Application No. PCT/US2014/046597, dated Sep. 25, 2014, 17 pp.

Response to Written Opinion dated Sep. 25, 2014, from International Application No. PCT/US2014/046597, filed on May 14, 2015, 6 pp.

Second Written Opinion from International Application No. PCT/US2014/046597, dated Jun. 12, 2015, 7 pp.

Response to Second Written Opinion dated Jun. 12, 2015, from International Application No. PCT/US2014/046597, filed on Aug. 12, 2015, 5 pp.

International Preliminary Report on Patentability from International Application No. PCT/US2014/046597, dated Oct. 14, 2015, 10 pp.

International Search Report and Written Opinion from International Application No. PCT/US2014/046602 dated Sep. 25, 2014, 15 pp.

Response to Written Opinion dated Sep. 25, 2014, from International Application No. PCT/US2014/046602, filed on May 15, 2015, 5 pp.

Second Written Opinion from International Application No. PCT/US2014/046602, dated Jun. 18, 2015, 7 pp.

Response to Second Written Opinion dated Jun. 18, 2015, from International Application No. PCT/US2014/046602, filed on Aug. 18, 2015, 5 pp.

International Preliminary Report on Patentability from International Application No. PCT/US2014/046602, dated Oct. 14, 2015, 10 pp.

Non-Final Office Action from related U.S. Appl. No. 14/330,985 dated Jun. 28, 2016 (14 pages).

Amendment in Response to Office Action dated Jun. 28, 2016 from U.S. Appl. No. 14/330,985, filed Sep. 28, 2016 (12 pp).

\* cited by examiner

US 9,578,328 B2

CROSS-LAYER PARALLEL PROCESSING AND OFFSET DELAY PARAMETERS FOR VIDEO CODING

This application claims the benefit of U.S. Provisional Application No. 61/846,570, filed Jul. 15, 2013, the entire contents of which are incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4. ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for parallel processing of video coding. For example, this disclosure describes techniques for parallel processing in multi-layer video coding processes, including multi-layer extensions of the High Efficiency Video Coding (HEVC) standard. The techniques of this disclosure may also be applied to other multi-layer video coding standards and extensions of such standards, such as multiview HEVC (MV-HEVC). In some examples, the techniques include signaling information for processing multiple layers in parallel, such as offset delay information in a video parameter set (VPS). The techniques may also or include signaling information for processing multiple layers in parallel, such as tile alignment information. Aspects may also relate to techniques for determining a location of a collocated block in multi-layer video coding.

In an example, a method of decoding video data includes decoding, from a video parameter set (VPS) of a multi-layer bitstream, at least one of data that indicates whether any layers of the multi-layer bitstream have an inter-layer prediction restriction or data that indicates whether tile boundaries are aligned between at least two of the layers of the multi-layer bitstream, and decoding the multi-layer bitstream in accordance with the data decoded from the VPS.

In another example, a method of encoding video data includes encoding, in a video parameter set (VPS) of a multi-layer bitstream, at least one of data that indicates whether any layers of the multi-layer bitstream have an inter-layer prediction restriction or data that indicates whether tile boundaries are aligned between at least two of the layers of the multi-layer bitstream, and encoding the multi-layer bitstream in accordance with the data encoded in the VPS.

In another example, an apparatus that performs video coding includes a memory storing video data, and a video coder configured to code data of a video parameter set (VPS) of a multi-layer bitstream, including coding at least one of data that indicates whether any layers of the multi-layer bitstream have an inter-layer prediction restriction or data that indicates whether tile boundaries are aligned between at least two of the layers of the multi-layer bitstream, and code the multi-layer bitstream in accordance with the data of the VPS.

In another example, an apparatus that performs video coding includes means for coding data of a video parameter set (VPS) of a multi-layer bitstream, including at least one of data that indicates whether any layers of the multi-layer bitstream have an inter-layer prediction restriction or data that indicates whether tile boundaries are aligned between at least two of the layers of the multi-layer bitstream, and means for coding the multi-layer bitstream in accordance with the data of the VPS.

In another example, a non-transitory computer-readable medium stores instructions thereon that, when executed, cause a video coder to code data of a video parameter set (VPS) of a multi-layer bitstream, including coding at least one of data that indicates whether any layers of the multi-layer bitstream have an inter-layer prediction restriction or data that indicates whether tile boundaries are aligned between at least two of the layers of the multi-layer bitstream, and code the multi-layer bitstream in accordance with the data of the VPS.

In another example, a method of decoding video data includes determining a location of a reference sample associated with a reference picture of video data based on one or more scaled offset values, wherein the reference picture is included in a first layer of a multi-layer bitstream and the one or more scaled offset values indicate a difference in scale between the first layer and a second, different layer, determining a location of a collocated reference block of video data in the first layer based on the location of the reference sample, and decoding a current block of video data in the second layer relative to the collocated reference block.

In another example, a method of encoding video data includes determining a location of a reference sample associated with a reference picture of video data based on one or more scaled offset values, wherein the reference picture is included in a first layer of a multi-layer bitstream and the one or more scaled offset values indicate a difference in scale between the first layer and a second, different layer, determining a location of a collocated reference block of video data in the first layer based on the location of the reference sample, and encoding a current block of video data in the second layer relative to the collocated reference block.

In another example, an apparatus that performs video coding includes a memory storing video data, and a video coder configured to determine a location of a reference sample associated with a reference picture of video data based on one or more scaled offset values, wherein the reference picture is included in a first layer of a multi-layer bitstream and the one or more scaled offset values indicate a difference in scale between the first layer and a second, different layer, determine a location of a collocated reference block of video data in the first layer based on the location of the reference sample, and code a current block of video data in the second layer relative to the collocated reference block.

In another example, an apparatus that performs video coding includes means for determining a location of a reference sample associated with a reference picture of video data based on one or more scaled offset values, wherein the reference picture is included in a first layer of a multi-layer bitstream and the one or more scaled offset values indicate a difference in scale between the first layer and a second, different layer, means for determining a location of a collocated reference block of video data in the first layer based on the location of the reference sample, and means for coding a current block of video data in the second layer relative to the collocated reference block.

In another example, a non-transitory computer-readable medium stores instructions thereon that, when executed, cause a video coder to determine a location of a reference sample associated with a reference picture of video data based on one or more scaled offset values, wherein the reference picture is included in a first layer of a multi-layer bitstream and the one or more scaled offset values indicate a difference in scale between the first layer and a second, different layer, determine a location of a collocated reference block of video data in the first layer based on the location of the reference sample, and code a current block of video data in the second layer relative to the collocated reference block.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
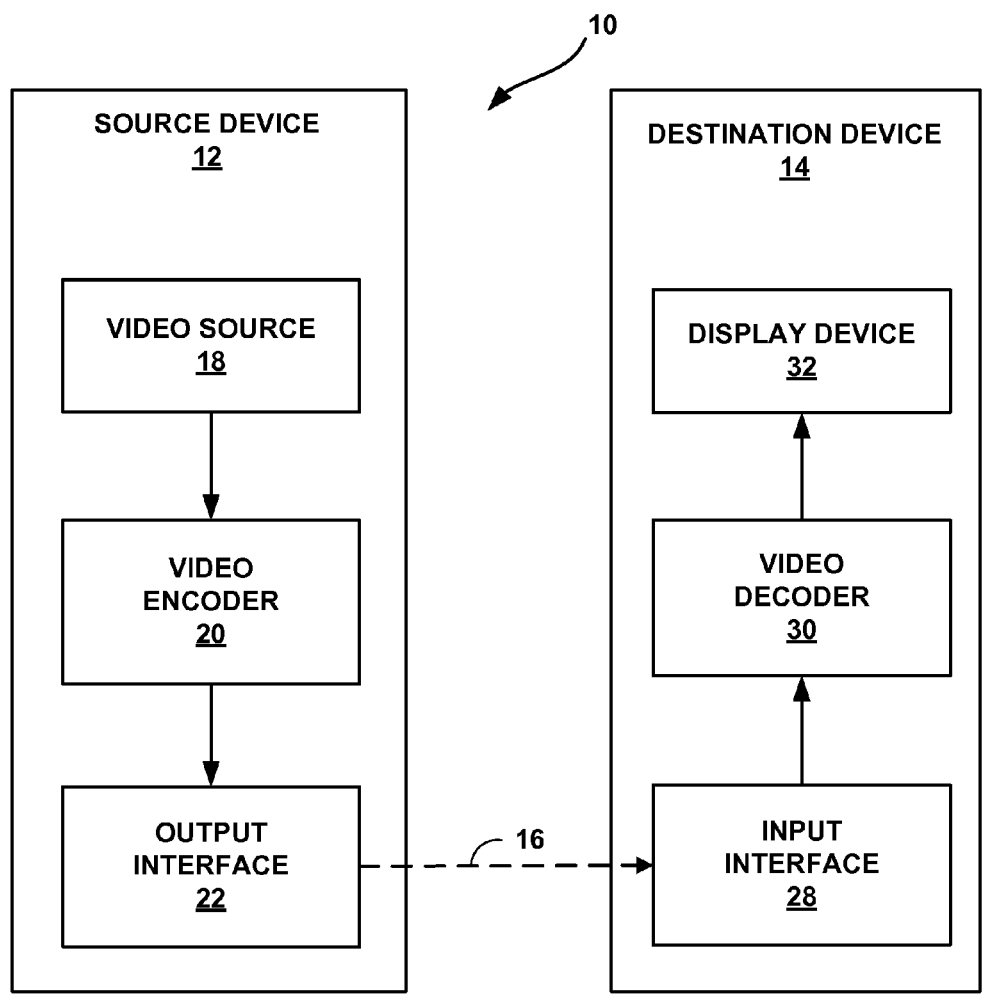
FIG. 1 is a block diagram illustrating an example video encoding and decoding system that may utilize techniques for processing video data in parallel.

Aspects of this disclosure may relate to various techniques associated with cross-layer parallel processing and offset delay parameters in video coding. In some instances, the techniques may be performed with multi-layer extensions to a High Efficiency Video Coding (HEVC) standard such as a Multi-view Video Coding extension to HEVC (MV-HEVC) or a Scalable Video Coding (SVC) extension to HEVC (SHVC). The techniques may also be used with other extensions to HEVC, other scalable coding standards, other multi-view coding standards (with or without a depth component) and/or other multi-layer video codecs. It should be understood that the techniques of this disclosure are not limited to any particular video coding standard. In addition, it should be understood that any of the techniques of this disclosure may be applied independently or in combination.

As described in greater detail below, aspects of this disclosure may include improvements related to signaling of cross-layer parallel processing offset delay parameters. An "offset delay" may generally refer to a delay associated with processing (e.g., encoding or decoding) multiple layers in parallel. For example, a video decoder may decode more than one layer of a multi-layer bitstream in parallel (i.e., the video decoder may decode multiple layers of a multi-layer bitstream simultaneously or synchronously). When using inter-layer prediction techniques to decode a current layer, however, the video decoder may access reference data of a reference layer that is different than the current layer. The reference data must be available (e.g., decoded) in order to be used as an inter-layer reference for decoding the current layer. Accordingly, in general, the video decoder finalizes decoding of all reference layers in a multi-layer decoding scheme prior to decoding a layer that refers to one or more of the reference layers.

In some instances, parallelism may be increased by implementing information referred to as offset delay information. That is, rather than waiting for an entire reference layer to be finalized (e.g., decoded), the video decoder may delay initiating decoding of a current layer until at least some of the reference layer has been decoded. The offset delay may generally indicate a minimum amount of a reference layer that is to be decoded before the video decoder begins decoding a current layer. Implementing an offset delay may help to ensure that inter-layer reference data is available to be used as a reference, while still allowing at least a portion of the reference layer and the current layer to be decoded in parallel. For example, a parallel decoder may start decoding an enhancement layer as soon as the specified reference layer offset delay is achieved. While the example above is described with respect to video decoding (as performed by a parallel decoder), it should be understood that similar techniques may be applied by a video encoder during parallel encoding.

In a general sense, texture view components, depth view components, and the various temporal, spatial, and quality layers may be thought of as somewhat interchangeable with respect to the present disclosure. For example, in some instances, a video coder may perform similar or the same inter-layer video coding techniques regardless of whether the multi-layer bitstream being coded includes texture view components, depth view components, or scalable components typically associated with scalable video coding (e.g., temporal, spatial, and/or quality layers). Accordingly, the techniques of the this disclosure may be thought of as applicable to "layers" in a general sense, where the layers may be any of texture view components, depth view components, temporal scalable layers, spatial scalable layers, or quality scalable layers. That is, it should be understood that the techniques described herein are broadly applicable to general "layers" as the term is described above.

One scheme for offset delay signaling was proposed in the document "Inter-Layer Delay Indication in VUI" to Skupin et al., JCTVC-M0463, Incheon, KR, 18-26 Apr. 2013 (hereinafter JCTVC-M0463). The scheme was designed to aid in parallel decoding across layers by signaling offset delay syntax elements in sequence parameter set (SPS) video usability information (VUI) that conveys the minimum required decoding delay for each layer. Under this scheme, the decoding of a particular layer can start as soon as the region in reference layer specified by the offset delay is decoded.

However, the scheme disclosed in JCTVC-M0463 may have some shortcomings. For example, an SPS may be associated with multiple layers with different identification values (e.g., as indicated by a nuh_layer_id syntax element). The proposed semantics of the syntax element num_ilp_restricted_ref_layers (introduced in JCTVC-M0463) restricts the value of the syntax element to be equal to the NumDirectRefLayers parameter for each layer that refers to the SPS (where the NumDirectRefLayers parameter indicates a particular direct reference layer). A direct reference layer is referred to directly by another layer for purposes of prediction. For example, given current layer A using layer B as a reference, reference layer B may be referred to as a direct reference layer. Given layer A using layer C as a reference, and where C refers to layer B, layer B may be referred to as an indirect reference layer.

In any case, for layers (that refer to a given SPS) that have different values of the NumDirectRefLayers parameter (i.e., layers whose respective values of the syntax element, num_ilp_restricted_ref_layers, differ amongst each other), or that may have slightly different offsets values, the proposed syntax structure of the syntax element. num_ilp_restricted_ref_layers, severely restricts the sharing of information within the SPS among these layers. In other words, a separate SPS may need to be signaled for each such layer that either possesses a distinct value of the NumDirectRefLayers parameter or that may have a slightly different offset value relative to other layers that refer to a given SPS. Thus, signaling of the offset delay information in the SPS may not be ideal.

In addition, to avoid a parsing dependency of a video parameter set (VPS) in a SPS. num_ilp_restricted_ref_layers (which indicates a particular reference layer having an inter-layer prediction restriction) is signaled in the SPS with a constraint that the value of num_ilp_restricted_ref_layers shall be equal to NumDirectRefLayers[nuh_layer_id], where nuh_layer_id is the nuh_layerid of any picture referring to the SPS. In other words, a number of reference layers may be forced to share the same offset delay information included in an SPS, despite the different layers having different characteristics that may otherwise impact offset delay.

According to aspects of this disclosure, offset delay information may be included in a video parameter set (VPS), which may be referred to by more than one layer. A VPS may include data describing the overall characteristics of a coded video sequence, including dependencies between sub-layers. One purpose of the VPS may be to enable compatible extensibility of a particular standard in terms of signaling at the systems layer. A VPS must typically be included in a multi-layer bitstream for the bitstream to be decoded.

By including the offset delay information in the VPS, the offset delay information may be separately specified for each reference layer. Such signaling may increase efficiency, as reference layers having different characteristics are not forced to share the same offset delay information. In addition, by including the offset delay information in the VPS, the value of syntax element num_ilp_restricted_ref_layers may be inferred (i.e., determined by the decoder without explicit signaling) during decoding (as described in greater detail below). Accordingly, the signaling of the number of reference layers having a restriction (e.g., the num_ilp_restricted_ref_layers syntax element noted above) may be avoided.

The techniques of this disclosure may also be applicable to determining a location of a collocated block of video data when using extended spatial scalability multi-layer video coding, and determining an offset delay associated with the collocated block. As described in greater detail below, a video bitstream may be referred to as being "scalable" when parts of the stream can be removed in a way that the resulting substream forms another valid bit stream decodable by a target decoder. With respect to spatial scalability, subsets of a bitstream represent the source content with a different picture size (spatial resolution). In each spatial layer, a video coder may implement motion-compensated prediction and intra-prediction in the same manner as for single-layer coding. However, in order to improve coding efficiency in comparison to simulcasting different spatial resolutions, the video coder may incorporate inter-layer prediction mechanisms. The most flexible type of spatial scalable video coding does not strictly adhere to a dyadic relation (e.g., a resolution ratio of 2:1) among consecutive layers and may be referred to as Extended Spatial Scalability (ESS). Certain details regarding SVC, with respect to both the SVC extension of H.264/AVC and the SVC extension of HEVC, are explained below with respect to FIGS. 4-9.

Extended spatial scalability may, in some instances, present challenges when determining an offset delay. For example, when a video coder uses extended spatial scalability, it is possible that a spatial segment A (e.g., a slice, a tile, a coding tree unit (CTU) or CTU row) of a layer currently being decoded may not have a collocated spatial segment B present (e.g., available for use as a reference) in a reference layer. Because offset delay may be determined based on a collocated spatial segment, it is not clear how to derive the offset delay for those spatial segments whose collocated spatial segments are not present.

The techniques of this disclosure may be implemented to determine a location of a collocated block of video data (e.g., a CTU). For example, aspects of this disclosure include determining a location of a reference sample associated with a reference picture of video data based on one or more scaled offset values. The scaled offset values may represent a difference in scale between the base layer and the scaled enhancement layer (e.g., a difference in location due to the scaling). After determining a location of the reference sample, a video coder (e.g., a video encoder or video decoder) may determine a location of a collocated reference block (e.g., a collocate CTU) based on the location of the reference sample.

As one example, a base layer may be used as a reference for an upscaled enhancement layer (e.g., a layer having a relatively higher spatial resolution than the base layer). Because of the differences in size between enhancement layer pictures and base layer pictures, a block currently being coded in an enhancement layer picture may map to a collocated reference block that is outside of the boundary of a base layer reference picture. Such a collocated block is not available for reference by the enhancement layer picture. In some examples, according to aspects of this disclosure, prior to determining the location of a collocated reference block in the base layer, the video coder may adjust the location of the reference sample to be located within the boundary of the reference picture in the base layer (i.e., the base layer reference picture).

Hence, according to aspects of this disclosure, when a collocated block (e.g., a collocated CTU) in a reference layer is not present for a particular block in a layer currently being coded, the address of the collocated block may be adjusted to fall within the corresponding reference layer boundary, such that the adjusted address corresponds to a block that is present in the reference layer. The inter-layer prediction constraints, such as offset delays described above, for the CTU in the current layer are then applied with the boundary CTU as the reference.

Aspects of this disclosure may also include techniques for indicating an alignment of tiles between layers. For example, a tile may include a partition of a picture and may be used for parallel coding. As described in the HEVC standard, a tile may be defined as a rectangular region of coding tree blocks (CTBs, as described below) within a particular tile column and a particular tile row in a picture. A tile column may be defined as a rectangular region of CTBs having a height equal to the height of the picture and a width specified by syntax elements in a picture parameter set (PPS). In addition, a tile row may be defined as a rectangular region of CTBs having a height specified by syntax elements in a PPS picture parameter set and a width equal to the width of the picture. Tile boundaries, similarly to slice boundaries, break parse and prediction dependences so that a tile can be processed independently, but the in-loop filters (de-blocking and sample adaptive offset (SAO)) may still cross tile boundaries (i.e., apply to multiple tiles). Implementing a tile-based structure may enable parallel processing, and improve coding efficiency by allowing a changed decoding order of CTUs compared to the use of slices.

The number of tiles and the location of the tiles' boundaries may be defined for an entire sequence or changed from picture to picture. One scheme for indicating whether tile boundaries are aligned between layers (which may impact inter-layer prediction) was proposed in the document "Tile Boundary Alignment and Inter-Layer Prediction Constraints for SHVC and MV-HEVC" to Suhring et al., JCTVC-M0464, Incheon, KR, 18-26 Apr. 2013 (hereinafter JCTVC-M0464). That scheme included signaling an indication of whether tiles boundaries are aligned (e.g., with a tile_boundaries_aligned_flag syntax element) in a VUI for each layer. However, signaling whether tile boundaries are aligned for layers in a VUI may be inefficient, because tile boundary alignment is not layer specific. Accordingly, signaling such information in a VUI may add needless complexity.

According to aspects of this disclosure, an indication of whether tile boundaries are aligned may be provided in a VPS. For example, one or more syntax elements may be included in a VPS that indicate whether tiles are aligned amongst layers of a multi-layer bitstream. In this way, the tile boundaries aligned information, as signaled in the VPS, has a cross-layer scope for the layers of the multi-layer bitstream.

FIG. 1 is a block diagram illustrating an example video encoding and decoding system 10 that may utilize techniques for processing video data in parallel. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for processing video data in parallel. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14. e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based three-dimensional video (3DV) extension. A joint draft of SVC and MVC is described in "Advanced video coding for generic audiovisual services," ITU-T Recommendation H.264, March 2010.

In addition, a High-Efficiency Video Coding (HEVC) standard has been developed by the Joint Collaboration Team on Video Coding (JCT-VC) of ITU-T Video Coding Experts Group (VCEG) and ISO/IEC Motion Picture Experts Group (MPEG). A recent HEVC text specification draft, referred to herein as HEVC WD10 for simplicity, is available from http://phenix.int-evry.fr/jct/doc_end_user/documents/13_Incheon/wg11/JCTVC-M0432-v3.zip. The multi-view extension to HEVC, referred to as MV-HEVC, is being developed by the JCT-3V. A recent Working Draft (WD) of MV-HEVC WD 4 hereinafter, is available from http://phenix.int-evry.fr/jct2/doc_end_user/documents/4_Incheon/wg11/JCT3V-D1004-v2.zip. Meanwhile, two standard tracks for more advanced 3D video coding (3D-HEVC) and scalable video coding based on HEVC are also under development. A recent test model description of 3D-HEVC is available from http://phenix.it-sudparis.eu/jct2/doc_end_user/documents/3_Geneva/wg11/JCT3V-D1005-v2.zip. A recent test model description of SHVC is available from http://phenix.int-evry.fr/jct/doc_end_user/documents/12_Geneva/wg11/JCTVC-M1007-v3.zip.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs), which may have separate luma and chroma component coding tree blocks (CTBs). For example, each of the CTUs may comprise a CTB of luma samples, two corresponding CTBs of chroma samples, and syntax structures used to code the samples of the CTBs. In a monochrome picture or a picture that have three separate color planes, a CTU may comprise a single CTB and syntax structures used to code the samples of the CTB. A CTB may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CTBs, CUs, PUs, transform units (TUs), macroblocks, macroblock partitions, and other similar partitions of a picture.

To generate a coded CTU, video encoder 20 may recursively perform quad-tree partitioning on the CTBs of a CTU to divide the CTBs into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion indicating a spatial displacement between a sample block of the PU and the first reference location and a second motion indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. An RBSP for a coded slice may include a slice header and slice data.

In MV-HEVC, 3D-HEVC and SHVC, video encoder 20 may generate a bitstream that comprises a series of network abstraction layer (NAL) units. Different NAL units of the bitstream may be associated with different layers of the bitstream. A layer may be defined as a set of video coding layer (VCL) NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

In 3D video coding, a layer may contain either all coded depth pictures of a specific view or coded texture pictures of a specific view. Similarly, in the context of scalable video coding, a layer typically corresponds to coded pictures having video characteristics different from coded pictures in other layers. Such video characteristics typically include spatial resolution and quality level (Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. NAL units only encapsulate data of a single layer. Thus, NAL units encapsulating data of the highest remaining layer of the bitstream may be removed from the bitstream without affecting the decodability of data in the remaining layers of the bitstream. In multi-view coding and 3D-HEVC, higher layers may include additional view components. In SHVC, higher layers may include signal to noise ratio (SNR) enhancement data, spatial enhancement data, and/or temporal enhancement data. In MV-HEVC, 3D-HEVC and SHVC, a view may be referred to as a "base layer" if a video decoder can decode pictures in the view without reference to data of any other layer. The base layer may conform to the HEVC base specification.

Video encoder 20 and/or video decoder 30 may be configured to implement any combination of the techniques of this disclosure. For example, as noted above, aspects of this disclosure include improvements related to signaling of cross-layer parallel processing offset delay parameters. An "offset delay" may generally refer to a delay associated with decoding multiple layers in parallel. For example, rather than waiting for an entire reference layer to be decoded, video decoder 30 may delay decoding of a current layer until at least some of the reference layer has been decoded. The offset delay may generally indicate a minimum amount of a reference layer that is decoded before the video decoder begins decoding a current layer.

According to aspects of this disclosure, data indicating an offset delay may be included in a VPS. For example, video encoder 20 may encode data (e.g., one or more syntax elements) indicating offset delay information in a VPS. Likewise, video decoder 30 may decode, from an encoded bitstream, the data indicating offset delay information. The offset delay information may be referred to by more than one layer. For example, according to aspects of this disclosure, video encoder 20 and/or video decoder 30 may signal/decode offset delay information according to Table 1 below:

TABLE 1

| vps_extension( ) { | Descriptor |
|---|---|
| .... | |
|   ilp_restricted_ref_layers_flag | u(1) |
|   if( ilp_restricted_ref_layers_flag ) | |
|     for( i = 1; i <= vps_max_layers_minus1; i++ ) | |

TABLE 1-continued

| vps_extension( ) { | Descriptor |
|---|---|
|       for( j = 0; j < NumDirectRefLayers[ layer_id_in_nuh[ i ] ]; j++ ) { | |
|         min_spatial_segment_offset_plus1[ i ][ j ] | ue(v) |
|         if( min_spatial_segment_offset[ i ][ j ] > 0 ) { | |
|           ctu_based_offset_enabled_flag[ i ][ j ] | u(1) |
|           if( ctu_based_offset_enabled_flag[ i ][ j ] ) | |
|             min_horizontal_ctu_offset_plus1[ i ][ j ] | ue(v) |
|         } | |
|       } | |
| } | |

In Table 1 above, the syntax element ilp_restricted_ref_layers_flag equal to 0 indicates that no restriction on inter-layer prediction is signaled for any of the direct reference layers of any layer referring to the VPS. However, the syntax element ilp_restricted_ref_layers_flag equal to 1 specifies that restrictions on inter-layer prediction may apply for any of the direct reference layers of one or more layers referring to the VPS.

In another example, in Table 1 above, the syntax element ilp_restricted_ref_layers_flag equal to 0 may indicate that restrictions on inter-layer prediction may or may not apply. In this example, however, the syntax element ilp_restricted_ref_layers_flag equal to 1 may indicate that restrictions on inter-layer prediction are signaled for any of the direct reference layers of any layer referring to the VPS.

In addition, the syntax elements min_spatial_segment_offset_plus1, ctu_based_offset_enabled_flag, and min_horizontal_ctu_offset_plus1 may be similar to those described in JCTVC-M0463, but may be moved from an SPS to the VPS. For example, min_spatial_segment_offset_ plus1[i][j] may indicate the spatial area, in each picture of the j-th direct reference layer, that is not used for inter-layer prediction for decoding of a picture with layer index i and referring to the VPS, by itself or together with min_horizontal_ctu_offset_plus1 [i][j], as specified below. The value of min_spatial_segment_offset_plus1[i][j] shall be in the range of 0 to refPicWidthInCtbsY[j]*refPicHeightInCtbsY[j], inclusive. When not present, the value of min_spatial_segment_offset_plus1[i][j] may be inferred to be equal to 0. In some examples, the minimum spatial segment may be associated with a variety of units of video data, such as a CTU, a slice, or a tile.

In addition, the syntax element ctu_based_offset_enabled_flag[i][j] equal to 1 specifies that the spatial area, in units of CTUs, in each picture of the j-th direct reference layer, that is not used for inter-layer prediction for decoding of a picture with layer index i and referring to the VPS is indicated by min_spatial_segment_offset_plus1[i][j] and min_horizontal_ctu_offset_plus1[i][j] together. However, the syntax element ctu_based_offset_enabled_flag[i][j] equal to 0 specifies that the spatial area, in units of slice segments, tiles, or CTU rows, in each picture of the j-th direct reference layer, that is not used for inter-layer prediction for decoding of a picture referring to the SPS is indicated by min_spatial_segment_offset_plus1[i][j] only. When not present, the value of ctu_based_offset_enabled_flag[i][j] is inferred to be equal to 0.

In addition, the syntax element min_horizontal_ctu_offset_plus1[i][j], when the syntax element ctu_based_offset_enabled_flag[i][j] is equal to 1, indicates the spatial area, in each picture of the j-th direct reference layer, that is not used for inter-layer prediction for decoding of a picture with layer index i and referring to the VPS, together with min_spatial_segment_offset_plus1[i][j], as specified below. The value of min_horizontal_ctu_offset_plus1 [i][j] shall be in the range of 0 to refPicWidthInCtbsY[j], inclusive.

Accordingly, in the example above, video encoder 20 and/or video decoder 30 may code data that indicates whether any layers of a multi-layer bitstream have an inter-layer prediction restriction, and the data may be included in a VPS. For example, video encoder 20 may encode an ilp_restricted_ref_layers_flag syntax element to indicate that at least one reference layer for a layer currently being encoded has an associated offset delay. Likewise, video decoder 30 may decode, from a VPS, an ilp_restricted_ref_layers_flag syntax element. In this example, video decoder 30 may determine whether one or more reference layers for a layer currently being coded have an associated offset delay. If such a delay is indicated, video decoder 30 may wait to decode the current layer until an amount of data consistent with the offset delay information has been decoded from the one or more reference layers.

In another example, video encoder 20 and/or video decoder 30 may code data (e.g., one or more syntax elements) indicating offset delay parameters in a supplemental enhancement information (SEI) message. For example, according to aspects of this disclosure, video encoder 20 and/or video decoder 30 may signal/decode offset delay information according to Table 2 below:

TABLE 2

| offset_delay_prameter_info( payloadSize ) { | Descriptor |
|---|---|
| lp_sei_active_vps_id | ue(v) |
| ilp_restricted_ref_layers_flag | u(1) |
| if( ilp_restricted_ref_layers_flag ) | |
| for( i = 1; i <= vps_max_layers_minus1; i++ ) | |
| for( j = 0; j < NumDirectRefLayers[ layer_id_in_nuh[ i ] ]; j++ ) { | |
| min_spatial_segment_offset_plus1[ i ][ j ] | ue(v) |
| if( min_spatial_segment_offset[ i ][ j ] > 0 ) { | |
| ctu_based_offset_enabled_flag[ i ][ j ] | u(1) |
| if( ctu_based_offset_enabled_flag[ i ][ j ] ) | |
| min_horizontal_ctu_offset_plus1[ i ][ j ] | ue(v) |
| } | |
| } | |

In the example of Table 2, the syntax element lp_sei_active_vps_id identifies an active VPS that contains the information about the layers in the coded video sequence (CVS). The value of the syntax element lp_sei_active_vps_id shall be equal to the value of the syntax element vps_video_parameter_set_id of the active VPS for the VCL NAL units of the access unit containing the SEI message. The semantics of the syntax elements ilp_restricted_ref_layers_flag, min_spatial_segment_offset_plus1, ctu_based_offset_enabled_flag, min_horizontal_ctu_offset_plus1 may be the same as those described above with respect to Table 1. In still another example, the signaling of the syntax element lp_sei_active_vps_id may be omitted.

As noted above, the techniques of this disclosure also relate to extended spatial scalability. e.g., determining a location of a collocated CTU and associated offset delay when using extended spatial scalability. As noted above with respect to Tables 1 and 2, the syntax elements min_spatial_segment_offset_plus and min_horizontal_ctu_offset_plus1 may indicate the decoding delay of the current layer introduced by coding dependencies with respect to the corresponding reference layer in terms of spatial segments. After receiving an indication of a particular CTU offset delay, video decoder 30 may locate a collocated CTU to implement the offset delay. That is, video decoder 30 may determine which CTUs are available for inter-layer prediction in the layer currently being coded and map the CTUs to a collocated CTU in a reference layer.

According to aspects of this disclosure, video encoder 20 and/or video decoder 30 may derive a collocated sample (e.g., a collocated reference sample) and a collocated CTU. The location of the collocated CTU may be based on the collocated sample.

In an example for purposes of illustration, assume a sample currently being coded in a first layer (e.g., an enhancement layer) is coded relative to a reference sample in a second, different layer (e.g., a base layer). Video encoder 20 and/or video decoder 30 may locate a reference sample in the base layer based on scaled offsets associated with the base layer. The scaled offsets may be defined based on the spatial difference between the base layer and the enhancement layer. According to aspects of this disclosure, video encoder 20 and/or video decoder 30 may locate a collocated CTU in the base layer based on the located reference sample. For example, video encoder 20 and/or video decoder 30 may locate a collocated CTU based on the following equations:

$$xColCtb = xRef >> refCtbLog2SizeY[i],$$

$$yColCtb = yRef >> refCtbLog2SizeY[i],$$

$$colCtbAddr[i] = xColCtb[i] + (yColCtb[i] * refPicWidthinCtbsY[i])$$

where xColCtb represents an x-component of a CTU (e.g., the luma CTB or one of the chroma CTBs of the CTU), xRef represents an x-coordinate of the collocated sample, yColCtb represents an y-component of the collocated CTU, yRef represents an y-coordinate of the collocated sample, and colCtbAddr[i] represents the address of the collocated CTU. In addition, the variables refCtbLog2SizeY[i][j], refPicWidthInCtbsY[i][j], and refPicHeightInCtbsY[i][j] may be set equal to CtbLog2SizeY, PicWidthInCtbsY, and PicHeightInCtbsY, respectively, of the j-th direct reference layer of the i-th layer.

In addition, according to aspects of this disclosure, when the collocated CTU is not present within the boundary of a reference layer for a particular CTU in the current layer, video encoder 20 and/or video decoder 30 may adjust the values of a CTU address to the corresponding reference layer boundary, such that the adjusted address corresponds to a CTU that is present in the reference layer. If the collocate CTU is within the reference picture, no adjustment may be needed.

Video encoder 20 and/or video decoder 30 may adjust the location by clipping the location of the samples xRef and yRef (e.g., x- and y-coordinates of the collocated sample) to the corresponding reference layer boundary before deriving the address of the collocated CTU based on the equations below:

$$xRef[i] = Clip3(leftStart, rightEnd-1, xRef[i]),$$

$$yRef[i] = Clip3(topStart, bottomEnd-1, yRef[i]),$$

where xRef[i] represents the x-coordinate of the collocated sample, yRef[i] represents the y-coordinate of the collocated sample, leftStart represents the left edge of a reference layer (e.g., base layer) relative to the current layer (e.g., an enhancement layer), rightEnd represents the right edge of the reference layer relative to the current layer, topStart represents the top edge of the reference layer relative to the current layer, and bottomEnd represents the bottom edge of the reference layer relative to the current layer. The function Clip 3 (x, y, z) may output x if z<x, output y if z>y, and output z otherwise.

The equations above limit the values of the collocated sample to be located within the reference layer. For example, when a horizontal location of the reference sample is located to the left of a left reference picture boundary, the video coder may replace the horizontal location with a location of the left reference picture boundary. Likewise, when the horizontal location of the reference sample is located to the right of a right reference picture boundary, the video coder may replace the horizontal location with a location of the right reference picture boundary. When a vertical location of the reference sample is located above a top reference picture boundary, the video coder may replace the vertical location with a location of the top reference picture boundary. When the vertical location of the reference sample is located below a bottom reference picture boundary, the video coder may replace the vertical location with a location of the bottom reference picture boundary. Video encoder 20 and/or video decoder 30 may then apply the inter-layer prediction constraints (e.g., offset delays) for the CTU in the current layer with the determined boundary CTU as the reference.

In this way, video encoder 20 and/or video decoder 30 may determine a location of a collocated CTU that is present within a boundary a reference layer and apply an inter-layer prediction restriction (e.g., offset delay) appropriately.

Still other techniques of this disclosure relate to improvements in signaling that CTU offsets are enabled (e.g., the ctu_based_offset_enabled_flag syntax element noted above in Table 1 and Table 2). For example, the ctu_based_offset_enabled_flag syntax element may be used to specify that the offset delay being signaled is in units of CTUs. In other words, when the value of the ctu_based_offset_enabled_flag syntax element is equal to 1, the spatial area, in units of CTUs, in each picture of the i-th direct reference layer, that is not used for inter-layer prediction for decoding of a picture referring to the SPS is indicated by the syntax element min_spatial_segment_offset_plus1[i] and the syntax element min_horizontal_ctu_offset_plus1[i] together.

The current design for ctu_based_offset_enabled_flag signaling for HEVC extensions, such as that described in JCTVC-M0463, may have certain drawbacks. For example, signaling a CTU-based offset delay for one layer and signaling a slice-, tile-, or CTU row-based offset delay for another layer (e.g., no CTU-based offset delay) may be relatively complicated. For example, in most cases, the spatial segments used to indicate an offset delay may be the same for all the layers, making the separate signaling unnecessarily complex. In this sense, it may be desirable to have a ctu_based_offset_enabled_flag syntax element as a global flag applicable to all layers and their direct reference layers.

In addition, the min_horizontal_ctu_offset_plus1 syntax element may not be useful when there is more than one tile in either the current layer or the current layer's direct reference layer (a reference layer to which the current layer directly refers). For example, when tiles are not aligned, the value of the min_horizontal_ctu_offset_plus syntax element may point to a spatial segment that belongs to a different tile. This could potentially introduce the need to reference data of the different tile during coding, which may not be acceptable for purposes of parallel coding.

According to aspects of this disclosure, video encoder 20 and/or video decoder 30 may implement the VPS shown in Table 3 below (where the text [removed: . . . ] indicates deletions from JCTVC-M0463):

TABLE 3

| vps_extension( ) { | Descriptor |
|---|---|
| .... | |
| ilp_restricted_ref_layers_flag | u(1) |
| if( ilp_restricted_ref_layers_flag ) { | |
|   ctu_based_offset_enabled_flag | u(1) |
|   for( i = 1; i <= vps_max_layers_minus1; i++ ) | |
|     for( j = 0; j < | |
|     NumDirectRefLayers[ layer_id_in_nuh[ i ] ]; | |
| j++ ) { | |
|       min_spatial_segment_offset_plus1[ i ][ j ] | ue(v) |
|       if( min_spatial_segment_offset[ i ][ j ] > 0 ) { | |
|         [removed: ctu_based_offset_enabled_flag[ i ] [ j ]] | [removed: u(1)] |
|         if( ctu_based_offset_enabled_flag [removed: [ i ][ j ]]) | |
|           min_horizontal_ctu_offset_plus1[ i ][ j ] | ue(v) |
|       } | |
|     } | |
| } | |
| } | |

In the example of Table 3, the syntax element ctu_based_offset_enabled_flag equal to 1 specifies that the spatial area, in units of CTUs, for all direct reference layer pictures [removed from JCTVC-M0463: in each picture of the i-th direct reference layer], that is not used for inter-layer prediction for decoding of a picture referring to the [removed from JCTVC-M0463: SPS] VPS is indicated by the syntax element min_spatial_segment_offset_plus1[i] and the syntax element min_horizontal_ctu_offset_plus1 [i] together. The syntax element ctu_based_offset_enabled_flag equal to 0 specifies that the spatial area, in units of slice segments, tiles, or CTU rows, [removed from JCTVC-M0463: in each picture of the i-th direct reference layer] for all direct reference layer pictures, that is not used for inter-layer prediction for decoding of a picture referring to the VPS is indicated by min_spatial_segment_offset_plus1[i] only. When not present, the value of ctu_based_offset_enabled_flag[i] is inferred to be equal to 0. According to aspects of this disclosure, it may be a requirement of bitstream conformance that when the syntax element tiles_enabled_flag is equal to 1 for the active PPS of the all layer then the syntax element ctu_based_offset_enabled_flag shall be equal to 0.

In another example, video encoder 20 and/or video decoder 30 may implement the VPS shown in Table 4 below (where the text [removed: . . . ] indicates deletions from JCTVC-M0463):

TABLE 4

| vps_extension( ) { | Descriptor |
|---|---|
| .... | |
| ilp_restricted_ref_layers_flag | u(1) |
| if( ilp_restricted_ref_layers_flag ) { | |
|   for( i = 1; i <= vps_max_layers_minus1; i++ ) | |
|     ctu_based_offset_enabled_flag[ i ] | |
|     for( j = 0; j < | |
|     NumDircetRefLayers[ layer_id_in_nuh[ i ] ]; | |
| j++ ) { | |
|       min_spatial_segment_offset_plus1[ i ][ j ] | ue(v) |
|       if( min_spatial_segment_offset[ i ][ j ] > 0 ) { | |
|         [removed: ctu_based_offset_enabled_flag [ i ][ j ]] | [removed: u(1)] |
|         if( ctu_based_offset_enabled_flag[ i ] [removed: [ j ]] ) | |
|           min_horizontal_ctu_offset_plus1[ i ][ j ] | ue(v) |
|       } | |
|     } | |
|   } | |
| } | |

In the example of Table 4, the syntax element ctu_based_offset_enabled_flag[i] equal to 1 specifies that the spatial area, in units of CTUs, for all direct reference layer pictures [removed from JCTVC-M0463: in each picture of the i-th direct reference layer], that is not used for inter-layer prediction for decoding of a picture with layer index i referring to the VPS [removed from JCTVC-M0463: SPS] is indicated by the syntax element min_spatial_segment_offset_plus1[i] and the syntax element min_horizontal_ctu_offset_plus1[i] together. The syntax element ctu_based_offset_enabled_flag[i] equal to 0 specifies that the spatial area, in units of slice segments, tiles, or CTU rows, for all direct reference layer pictures [removed from JCTVC-M0463: in each picture of the i-th direct reference layer], that is not used for inter-layer prediction for decoding of a picture with layer index i referring to the VPS is indicated by min_spatial_segment_offset_plus1 [i] only. When not present, the value of the syntax element ctu_ based_offset_enabled_flag[i] is inferred to be equal to 0. According to aspects of this disclosure, it may be a requirement of bitstream conformance that when the syntax element tiles_enabled_flag is equal to 1 for the active PPS of the all layer then the syntax element ctu_based_offset_enabled_flag shall be equal to 0. The above syntax elements may be signaled in a SPS, a PPS, a slice header or its extensions. The above syntax may also be signalled as an SEI message or as an VUI message.

Still other techniques of this disclosure relate to indicating an alignment of tiles between layers. For example, as noted above, a tile may include a partition of a picture and may be used for parallel coding. Tile boundaries, similarly to slice boundaries, break parse and prediction dependences so that a tile can be processed independently, but the in-loop filters (de-blocking and sample adaptive offset (SAO)) may still cross tile boundaries. Implementing a tile-based structure may enable parallel processing, and improve coding efficiency by allowing a changed decoding order of CTUs compared to the use of slices.

For example, without loss of generality, assume that four tiles are used for reference and enhancement layers. In this case, video encoder 20 and/or video decoder 30 may perform coding with four processor cores, each of which is dedicated to a respective one of the tiles. The alignment of tiles between layers may be germane to the manner in which the tiles are processed. For example, to ensure that the four tiles may be processed in parallel, video encoder 20 and/or video decoder 30 may impose certain restrictions. For example, the up-sampling of inter-layer filtering may not be allowed to cross tile boundaries in a reference layer. For an enhancement tile, collocated samples of a reference layer are regarded as unavailable if the reference layer samples belong to (i.e., are included within) tiles which are not aligned to this enhancement tile.

According to aspects of this disclosure, an indication of whether tile boundaries are aligned may be provided in a VPS. For example, video encoder 20 may encode (and video decoder 30 may parse and decode) one or more syntax elements in a VPS that indicate whether layers of a multi-layer bitstream are constrained to be aligned. The tile boundaries aligned information, as signaled in the VPS, may have a cross-layer scope that applies to all layers of the bitstream.

In an example, video encoder 20 and/or video decoder 30 may implement the VPS shown in Table 5 below:

TABLE 5

| vps_extension( ) { | Descriptor |
|---|---|
| for( i = 1; i <= vps_max_layers_minus1; i++ ) | |
|   for( j = 0; j < i; j++ ) | |
|     if( direct_dependency_flag[ i ][ j ] ) | |
|       direct_dependency_type[ i ][ j ] | u(v) |
|   single_layer_for_non_irap_flag | |
|   tile_boundaries_aligned_flag | u(1) |
|   ...... | |
| } | |

In the example of Table 5, the syntax element tile_boundaries_aligned_flag equal to 1 indicates that when any two samples of one picture in an access unit belong to one tile, the collocated samples, if any, in another picture in the same access unit belong to one tile, and when any two samples of one picture in an access unit belong to different tiles, the collocated samples in another picture in the same access unit shall belong to different tiles. The syntax element tile_boundaries_aligned_flag equal to 0 indicates that such a restriction may or may not apply. For example, the syntax element tile_boundaries_aligned_flag equal to 0 may indicate that tiles may be aligned, but are not strictly constrained to be aligned.

Accordingly, the techniques may allow video decoder 30 to determine, for a layer currently being decoded, whether the tile boundaries of the current layer are aligned with any reference layer of the current layer by decoding the VPS. For example, video decoder 30 may determine whether each direct reference layer (e.g., indicated by the direct dependency flag) has tile boundaries that are aligned with the tiles of the current layer.

Figure 2:
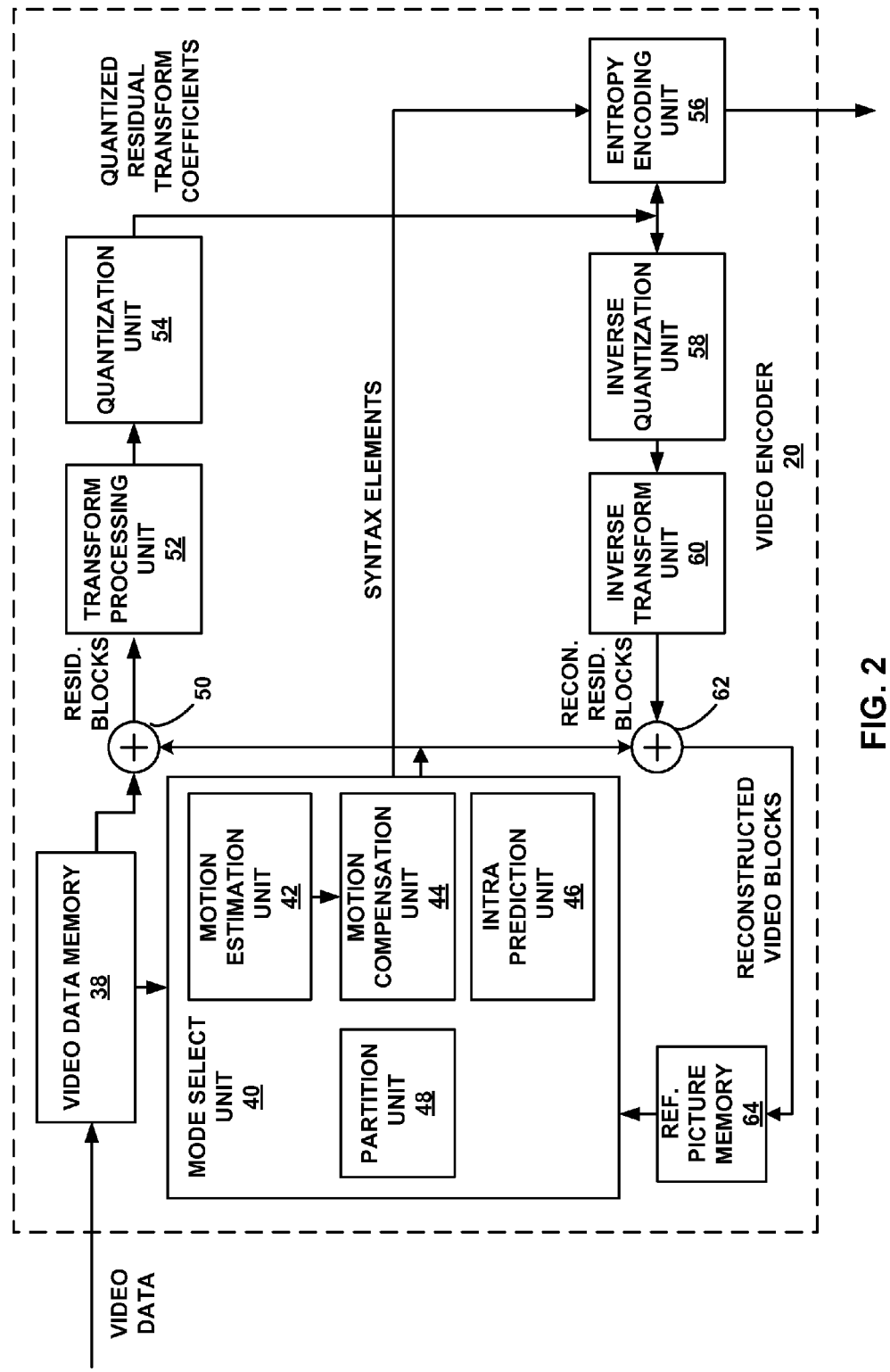
FIG. 2 is a block diagram illustrating an example of a video encoder that may implement techniques for processing video data in parallel.

FIG. 2 is a block diagram illustrating an example of video encoder 20 that may implement techniques for processing video data in parallel. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As noted above, video encoder 20 may be adapted to perform multiview and/or scalable video coding. For example, video encoder 20 may be configured to encode a bitstream that conforms to one or more video coding standard extensions, such as SHVC, MV-HEVC, or 3D-HEVC. However, while reference is made to specific coding standards, it should be understood that the techniques are not specific to any one coding standard, and may be implemented with future and/or not yet developed standards.

As shown in FIG. 2, video encoder 20 receives a current video block within a video frame to be encoded. In the example of FIG. 2, video encoder 20 includes video data memory 38, mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

Video data memory 38 may store video data to be encoded by the components of video encoder 20. The video data stored in video data memory 38 may be obtained, for example, from video source 18. Reference picture memory 64 may be referred to as a decoded picture buffer that stores reference video data for use in encoding video data by video encoder 20, e.g., in intra- or inter-coding modes. Video data memory 38 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 38 and reference picture memory 64 may be provided by the same memory device or separate memory devices. In various examples, video data memory 38 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Video encoder 20 represents an example of a video encoder that may be configured to perform any of the techniques of this disclosure, alone or in any combination. For instance, video encoder 20 may be configured to encode a multi-layer bitstream including at least one of, in a VPS, data that indicates whether any layers of the multi-layer bitstream have an inter-layer prediction restriction and data that indicates whether tile boundaries are aligned between at least two of the layers of the multi-layer bitstream, and encode the multi-layer bitstream in accordance with the data of the VPS. Additionally or alternatively, video encoder 20 may determine a location of a reference sample associated with a reference picture of video data based on one or more scaled offset values, where the reference picture is included in a first layer of a multi-layer bitstream and the one or more scaled offset values indicate a difference in scale between the first layer and a second, different layer. Video encoder 20 may also determine a location of a collocated reference block of video data in the first layer based on the location of the reference sample, and encode a current block of video data in the second layer relative to the collocated reference block.

Figure 3:
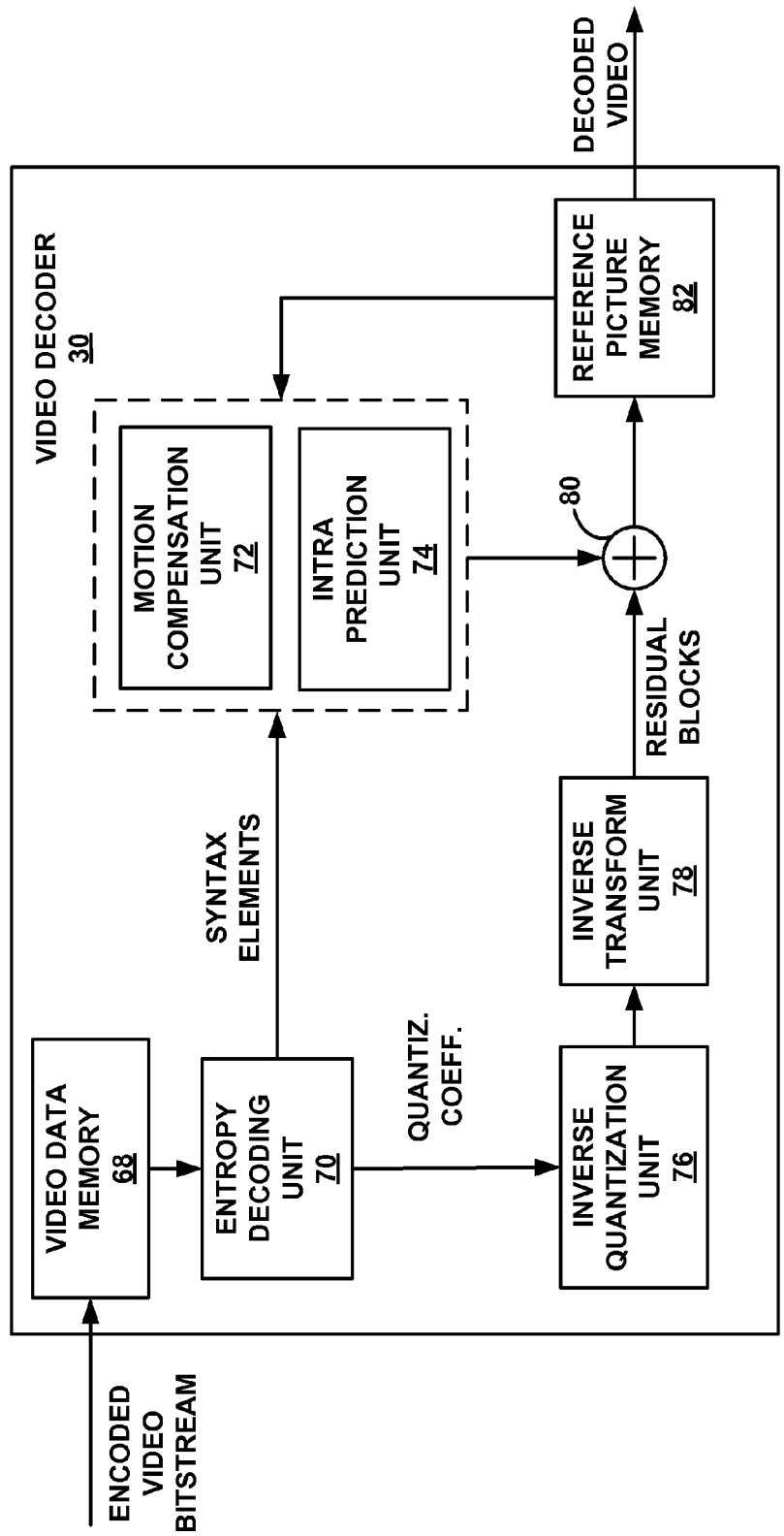
FIG. 3 is a block diagram illustrating an example of a video decoder that may implement techniques for processing video data in parallel.

FIG. 3 is a block diagram illustrating an example of video decoder 30 that may implement techniques for processing video data in parallel. As noted above, video decoder 30 may be adapted to perform multiview and/or scalable video coding. For example, video decoder 30 may be configured to decode a bitstream that conforms to one or more video coding standard extensions, such as SHVC, MV-HEVC, or 3D-HEVC. However, while reference is made to specific coding standards, it should be understood that the techniques are not specific to any one coding standard, and may be implemented with future and/or not yet developed standards.

In the example of FIG. 3, video decoder 30 includes video data memory 68 an entropy decoding unit 70, motion compensation unit 72, intra-prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

Video data memory 68 may store video data, such as an encoded video bitstream, to be decoded by the components of video decoder 30. The video data stored in video data memory 68 may be obtained, for example, from computer-readable medium 16, e.g., from a local video source, such as a camera, via wired or wireless network communication of video data, or by accessing physical data storage media. Video data memory 68 may form a coded picture buffer (CPB) that stores encoded video data from an encoded video bitstream. Reference picture memory 82 may be referred to as a decoded picture buffer that stores reference video data for use in decoding video data by video decoder 30, e.g., in intra- or inter-coding modes. Video data memory 68 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 68 and reference picture memory 82 may be provided by the same memory device or separate memory devices. In various examples, video data memory 68 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter QPy calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Video decoder 30 may be configured to perform any or all of the techniques of this disclosure, alone or in any combination. For instance, video decoder 30 may be configured to decode, from a video parameter set (VPS) of a multi-layer bitstream, at least one of data that indicates whether any layers of the multi-layer bitstream have an inter-layer prediction restriction and data that indicates whether tile boundaries are aligned between at least two of the layers of the multi-layer bitstream, and decode the multi-layer bitstream in accordance with the data obtained from the VPS. Additionally or alternatively, video decoder 30 may determine a location of a reference sample associated with a reference picture of video data based on one or more scaled offset values, where the reference picture is included in a first layer of a multi-layer bitstream and the one or more scaled offset values indicate a difference in scale between the first layer and a second, different layer. Video decoder 30 may also determine a location of a collocated reference block of video data in the first layer based on the location of the reference sample, and decoding a current block of video data in the second layer relative to the collocated reference block.

Figure 4:
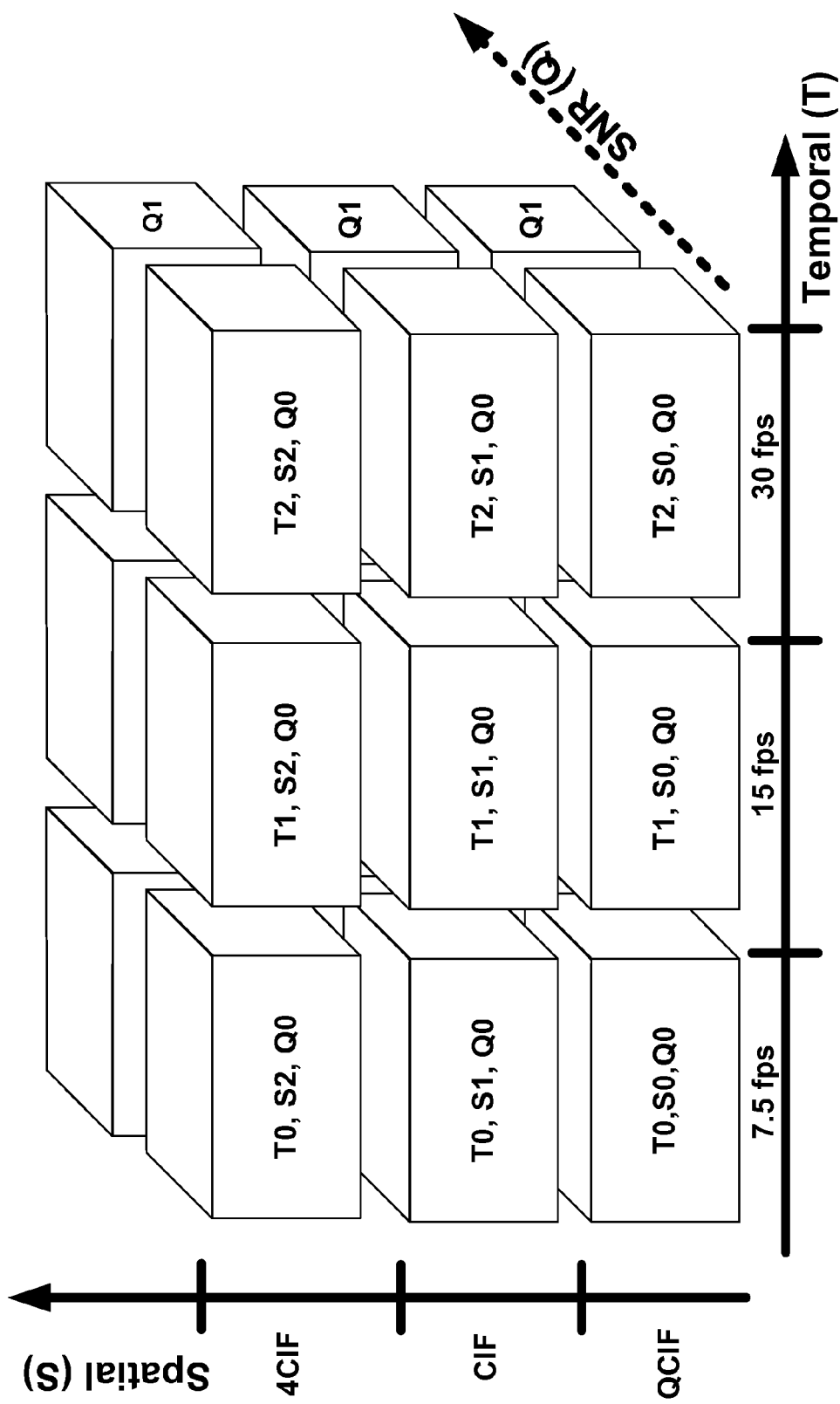
FIG. 4 is a conceptual diagram illustrating various scalable dimensions for scalable video coding (SVC).

FIG. 4 is a conceptual diagram illustrating various scalable dimensions for scalable video coding (SVC). FIG. 4 illustrates an example of the scalability structure of SVC. In particular, an example of scalabilities in different dimensions is shown in FIG. 4. In this example, scalabilities are enabled in three dimensions. In the time dimension, frame rates with 7.5 Hz, 15 Hz or 30 Hz can be supported by temporal scalability (T). When spatial scalability (S) is supported, different resolutions, such as QCIF, CIF, and 4CIF, may be enabled. For each specific spatial resolution and frame rate, signal-to-noise (SNR) (Q) layers can be added to improve the picture quality.

Once video content has been encoded in such a scalable way, an extractor tool may be used to adapt the actual delivered content according to application requirements, which may be dependent, e.g., on the clients or the transmission channel. In the example shown in FIG. 4, each cubic volume. i.e., cube, contains the pictures with the same frame rate (temporal level), spatial resolution and SNR layers. Better representation can be achieved by adding those cubes (pictures) in any dimension. Combined scalability may be supported when there are two, three or even more scalabilities enabled.

According to the SVC specification, the pictures with the lowest spatial and quality layer are compatible with H.264/AVC, and the pictures at the lowest temporal level form the temporal base layer, which can be enhanced with pictures at higher temporal levels. In addition to the H.264/AVC compatible layer, several spatial and/or SNR enhancement layers can be added to provide spatial and/or quality scalabilities. SNR scalability is also referred to as quality scalability. Each spatial or SNR enhancement layer itself may be temporally scalable, with the same temporal scalability structure as the H.264/AVC compatible layer. For one spatial or SNR enhancement layer, the lower layer it depends on is also referred to as the base layer of that specific spatial or SNR enhancement layer.

Figure 5:
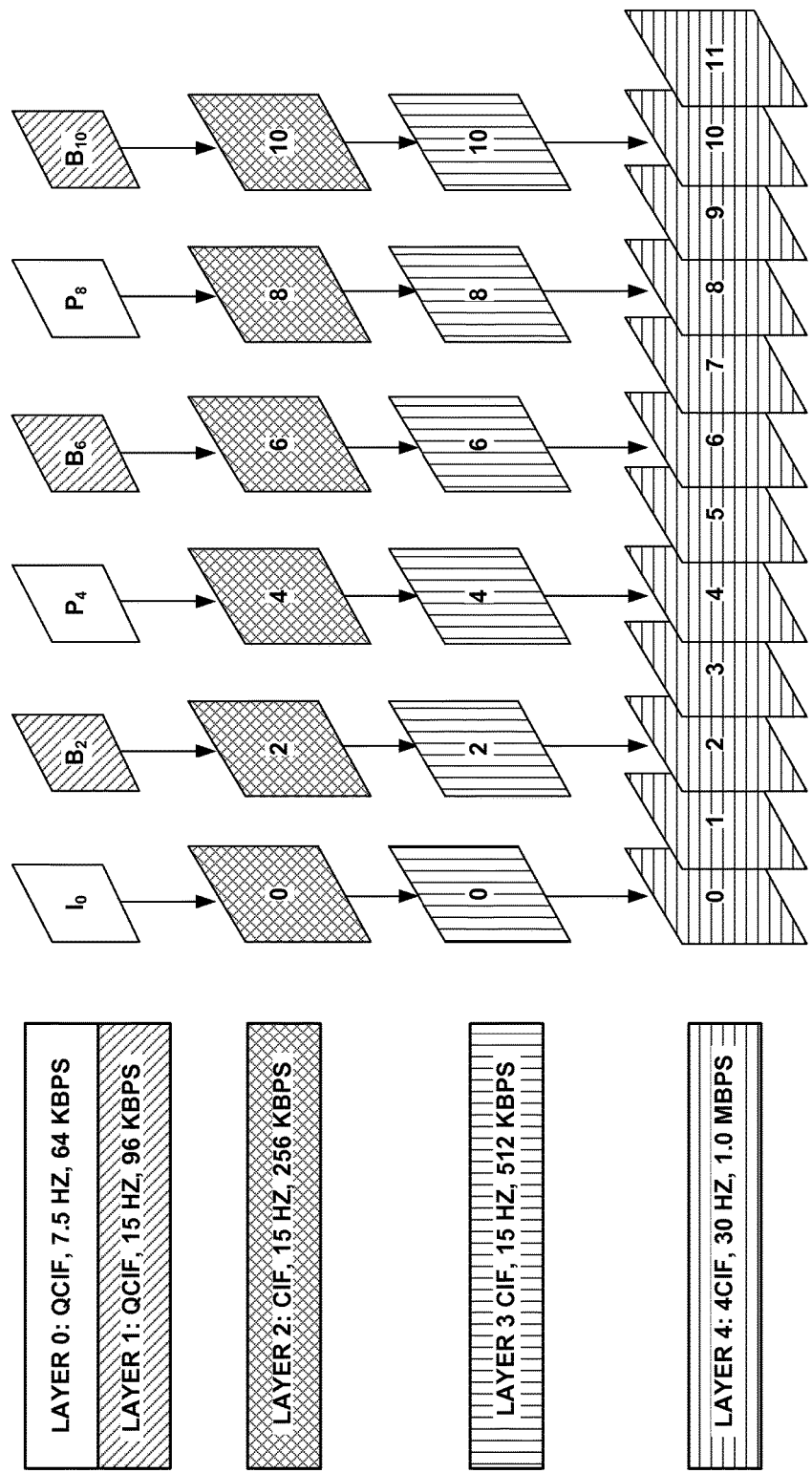
FIG. 5 is a conceptual diagram illustrating an example of the SVC coding structure.

FIG. 5 is a conceptual diagram illustrating an example of the SVC coding structure. In this example, the pictures with the lowest spatial and quality layer (pictures in layer 0 and layer 1, with QCIF resolution) are compatible with H.264/AVC. Among them, those pictures of the lowest temporal level form the temporal base layer, as shown in layer 0 of FIG. 5. This temporal base layer (layer 0) can be enhanced with pictures of higher temporal levels (layer 1). In addition to the H.264/AVC compatible layer, several spatial and/or SNR enhancement layers can be added to provide spatial and/or quality scalabilities. For instance, the enhancement layer can be a CIF representation with the same resolution as layer 2. In this example, layer 3 is a SNR enhancement layer. As shown in this example, each spatial or SNR enhancement layer itself may be temporally scalable, with the same temporal scalability structure as the H.264/AVC compatible layer. Also, an enhancement layer can enhance both spatial resolution and frame rate. For example, layer 4 provides a 4CIF enhancement layer, which further increases the frame rate from 15 Hz to 30 Hz.

Figure 6:
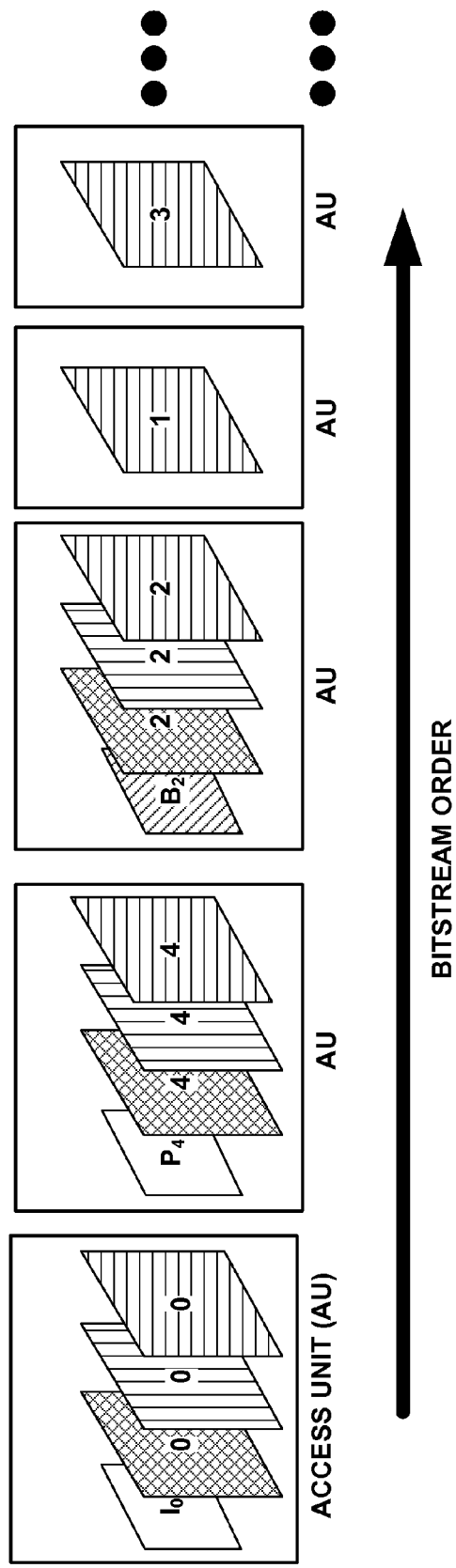
FIG. 6 is a conceptual diagram illustrating example access units (AUs).

FIG. 6 is a conceptual diagram illustrating example access units (AUs). Each AU includes one or more slices, encapsulated within network abstraction layer (NAL) units. There may be zero or more NAL units per access unit per layer. A set of NAL units corresponding to one layer within one access unit may be referred to as a "layer component." The example of FIG. 6 portrays layer components corresponding to the layer components of FIG. 5. As shown in the example of FIG. 6, the coded slices in the same time instance (i.e., within a common AU) are successive in the bitstream order and form one access unit in the context of SVC. Those SVC access units then follow the decoding order, which could be different from the display order and decided, e.g., by the temporal prediction relationship.

Scalable extensions of H.264/AVC (Advanced Video Coding) are described below. Some functionalities of SVC are inherited from H.264/AVC. Compared with previous scalable standards, some of the greatest advantages of the SVC extension to H.264/AVC, namely inter-layer prediction and single-loop decoding, are reviewed below.

The SVC extension of H.264/AVC supports single loop decoding. To keep a low-complexity decoder, single-loop decoding is mandatory in SVC. With single-loop decoding, each supported layer can be decoded with a single motion compensation loop. To achieve this, the usage of inter-layer intra-prediction is only allowed for enhancement layer macro blocks, for which the collocated reference layer signal is intra-coded. It is further required that all layers that are used to inter-layer predict higher layers are coded using constrained intra-prediction.

The SVC extension of H.264/AVC also supports inter-layer prediction. SVC introduces inter-layer prediction for spatial and SNR scalabilities based on texture, residue and motion. Spatial scalability in SVC has been generalized to any resolution ratio between two layers. SNR scalability can be realized by Coarse Granularity Scalability (CGS) or Medium Granularity Scalability (MGS). In SVC, two spatial or CGS layers belong to different dependency layers (indicated by the syntax element dependency_id in NAL unit header), while two MGS layers can be in the same dependency layer. One dependency layer includes quality layers with the value of the syntax element quality_id from 0 to higher values, corresponding to quality enhancement layers. In SVC, inter-layer prediction methods are utilized to reduce inter-layer redundancy. They are briefly introduced in the following paragraphs.

The coding mode using inter-layer intra prediction is called "IntraBL" mode in SVC. To enable single-loop decoding, only the macroblocks (MBs), which have collocated MBs in the base layer coded as constrained intra modes, can use inter-layer intra prediction mode. A constrained intra mode MB is intra-coded without referring to any samples from neighboring inter-coded MBs.

If an MB is indicated to use residual prediction, the collocated MB in the base layer for inter-layer prediction must be an inter MB and its residue may be up-sampled according to the spatial resolution ratio. The residue difference between the enhancement layer and that of the base layer is coded. That is, the reconstruction of the current frame $\hat{I}_e$ of the enhancement layer equals the sum of de-quantized coefficients $r_e$ of the enhancement layer, the temporal prediction $P_e$ from the enhancement layer, and the quantization normalized residual coefficients $r_b$ of the base layer, as shown below:

$$\hat{I}_e = r_e + P_e + r_b$$

The collocated base layer motion vectors may be scaled to generate predictors for the motion vectors of MB or MB partition in the enhancement layer. In addition, there is one MB type named base mode, which sends one flag for each MB. If this flag is true and the corresponding base layer MB is not intra, then motion vectors, partitioning modes and reference indices are all derived from base layer.

As noted above, similar to H.264/AVC. HEVC will also have scalable video coding extension, currently called SHVC, which will at least provide temporal scalability. SNR scalability and spatial scalability. In SHVC, to achieve inter-layer texture prediction, the reference layer reconstructed samples are first up-sampled when the resolution of the reference layer is lower than that of the enhancement layer. Even in the SNR scalability case, the reference layer samples may be filtered before being used for inter-layer prediction to obtain higher coding efficiency. The up-sampling or inter-layer filtering process may be performed for whole layer pictures, which may also be referred to as layer components or simply pictures. In SHVC, a multi-loop decoding structure may be used and a video decoder (such as video decoder 30) may process different layers in parallel.

According to aspects of this disclosure, offset delay information for multi-layer video coding may be included in a video parameter set (VPS). As noted above, the offset delay information may indicate a delay between coding (encoding or decoding) one layer relative to another layer to ensure that the reference data is available. According to aspects of this disclosure, video encoder 20 may encode data indicating offset delay information in a VPS. Likewise, video decoder 30 may decode, from an encoded bitstream, the data indicating offset delay information.

In some examples, a video coder (such as video encoder 20 and/or video decoder 30) may code data of a VPS that indicates whether any layers of a multi-layer bitstream have an inter-layer prediction restriction. For example, a flag may be included in the VPS to indicate that at least one reference layer for a layer currently being coded has an associated offset delay. Upon determining that at least one layer has an associated offset delay, the video coder may determine which reference layers have the offset delay and the offset delay associated with such layers. That is, the offset delay information may only be provided for reference layers having an offset delay.

Figure 7:
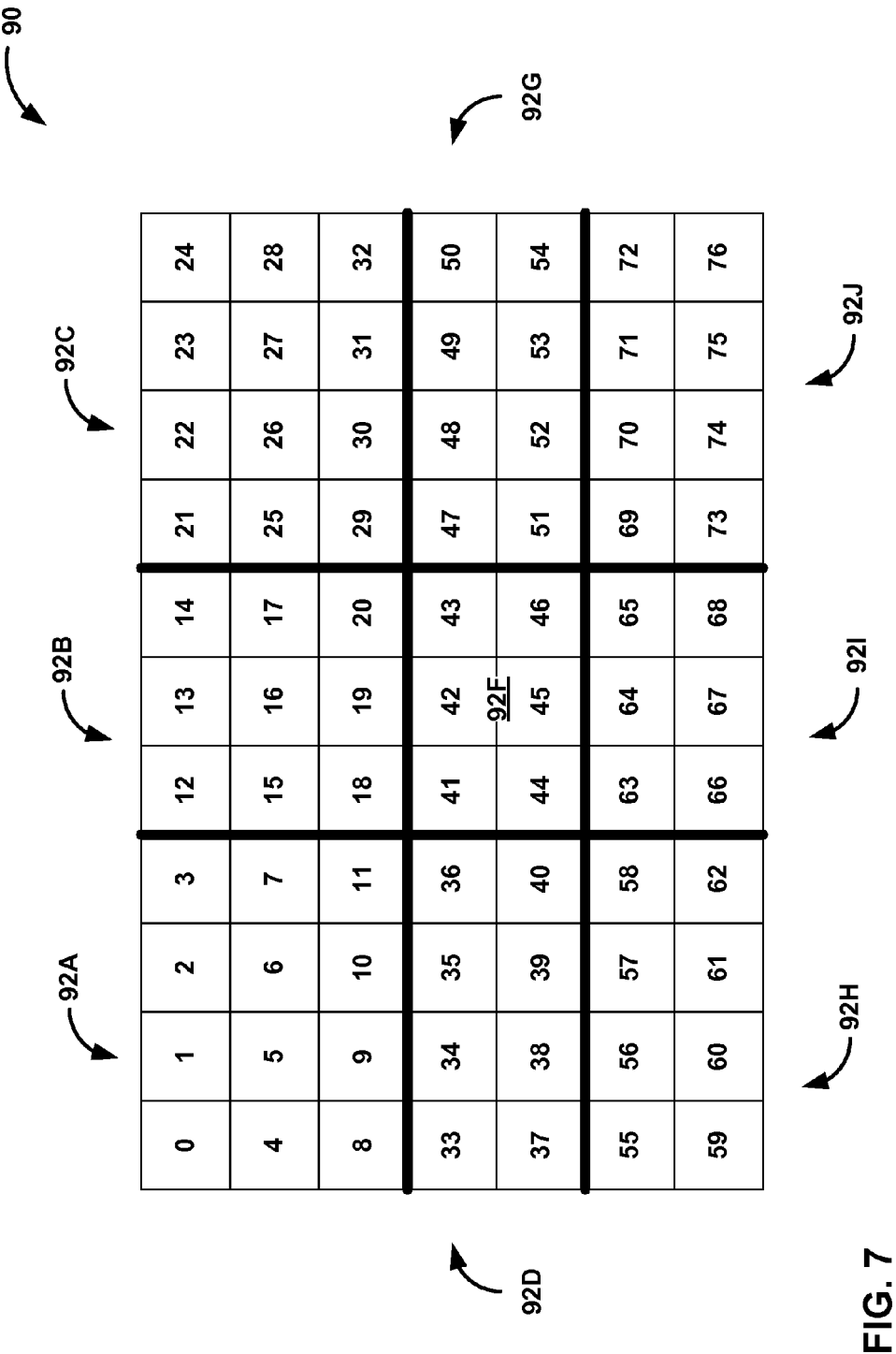
FIG. 7 is a conceptual diagram illustrating example tiles in accordance with the High Efficiency Video Coding (HEVC) standard.

FIG. 7 is a conceptual diagram illustrating example tiles in accordance with the High Efficiency Video Coding (HEVC) standard. HEVC contains several proposals to make the codec more parallel-friendly, including tiles and Wavefront parallel processing (WPP). HEVC WD10 defines tiles as an integer number of CTBs co-occurring in one column and one row, ordered consecutively in a CTB raster scan of the tile. The division of each picture into tiles may be referred to as a partitioning. Tiles in a picture are ordered consecutively in the tile raster scan of the picture as shown in FIG. 7.

For example, FIG. 7 illustrates an example CTB coding order for a picture 90 that is partitioned into multiple tiles 92A, 92B, 92C, 92D, 92E, 92F, 92G, 92H, 92I, and 92J (collectively, "tiles 92"), with tile boundaries indicated by the thick lines. Each square block in picture 90 represents a pixel block associated with a CTB. The numbers in the pixel blocks indicate positions of the corresponding CTBs (e.g., LCUs) in a tile coding order for picture 90. As illustrated in the example of FIG. 11. CTBs in tile 92A are coded first, followed by CTBs in tile 92B, followed by CTBs in tile 92C, followed by CTBs in tile 92D, followed by CTBs in tile 92E, followed by CTBs in tile 92F, followed by CTBs in tile 92G, followed by CTBs in tile 92H, followed by CTBs in tile 92I, followed by CTBs in tile 92J. Within each of tiles 92, the CTBs are coded according to a raster scan order.

The number of tiles and the location of their boundaries may be defined for the entire sequence or changed from picture to picture. Tile boundaries, similarly to slice boundaries, break parse and prediction dependences so that a tile can be processed independently. However, in some instances, in-loop filters (e.g., de-blocking and sample adaptive offset (SAO) filters) may still cross tile boundaries. For example, HEVC Working Draft 10 provides for a loop_filter_across_tiles_enabled_flag syntax element specified in a PPS. When the value of the loop_filter_across_tiles_enabled_flag syntax element is equal to 1, in-loop filtering operations may be performed across tile boundaries in pictures referring to the PPS. A loop_filter_across_tiles_enabled_flag syntax element equal to 0 specifies that in-loop filtering operations are not performed across tile boundaries in pictures referring to the PPS.

Using tiles may enhance parallelism, because no (or relatively little) communication is needed between processors or processor cores for entropy decoding and motion compensation reconstruction. In addition, tiles may exhibit a relatively better coding efficiency when compared to slices, because tiles allow picture partition shapes that contain samples with potentially higher correlation than slices. Tiles may also reduce slice header overhead.

When a tile is used in single-layer coding, the syntax element min_spatial_segmentation_idc may be used by a video decoder (such as video decoder 30) to calculate the maximum number of luma samples to be processed by one processing thread, making the assumption that video decoder 30 maximally utilizes the parallel decoding information. When not equal to 0, a min_spatial_segmentation_idc syntax element may help to establish a bound on the maximum possible size of distinct coded spatial segmentation regions in the pictures of the coded video sequence. In HEVC WD 10 there may be some picture inter-dependencies between the different threads, e.g., due to entropy coding synchronization or de-blocking filtering across tile or slice boundaries.

Figure 8:
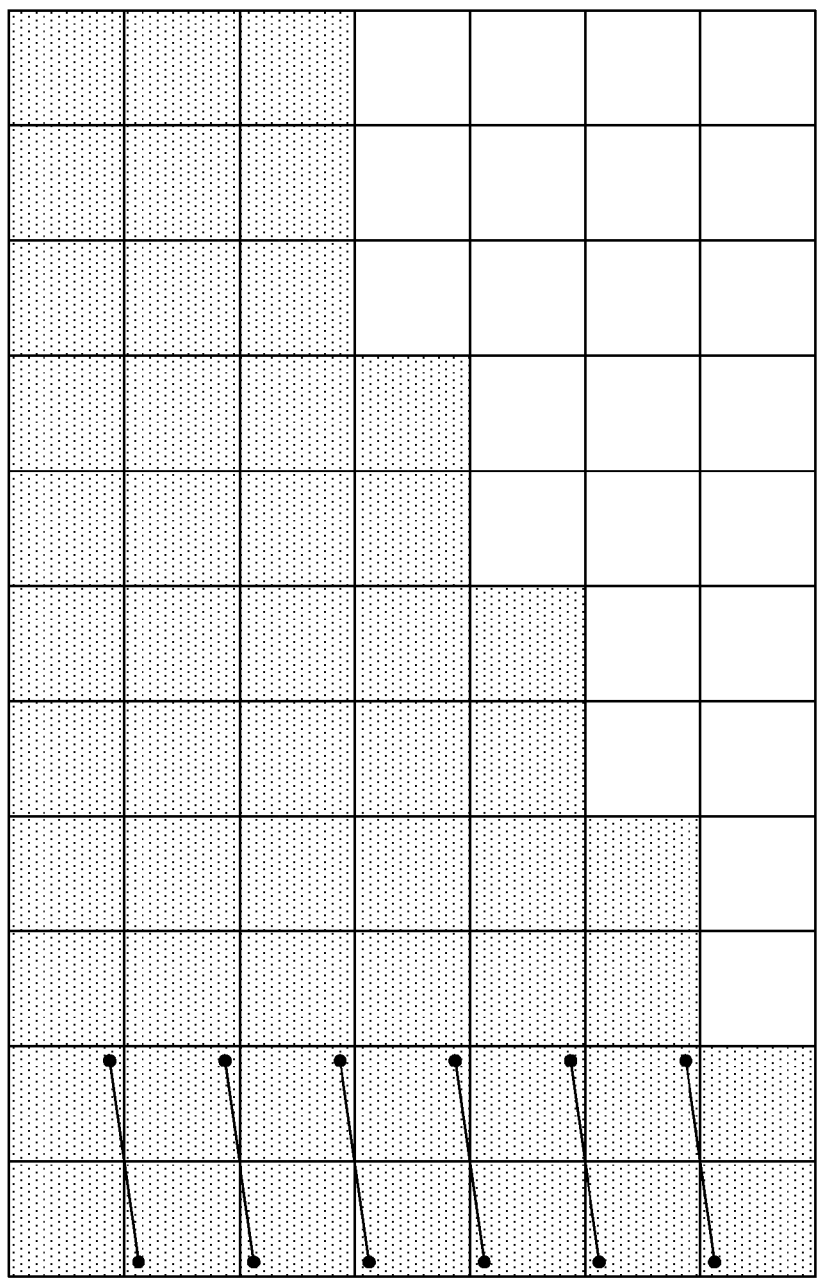
FIG. 8 is a conceptual diagram illustrating wavefronts for wavefront parallel processing (WPP).

FIG. 8 is a conceptual diagram illustrating wavefronts for wavefront parallel processing (WPP). HEVC defines a WPP technique. When WPP is enabled, each CTU row of a picture is a separated partition. Compared to slices and tiles, however, no coding dependences are broken at CTU row boundaries. Additionally, CABAC probabilities are propagated from the second CTU of the previous row, to further reduce the coding losses. Also, WPP does not change the regular raster scan order. Because dependences are not broken, the rate-distortion loss of a WPP bitstream is small, compared to a nonparallel bitstream.

When WPP is enabled, a number of processors up to the number of CTU rows can work in parallel to process the CTU row (or lines). The wavefront dependences, however, do not allow all the CTU rows to start decoding at the beginning of the picture. Consequently, the CTU rows also cannot finish decoding at the same time at the end of the picture. This introduces parallelization inefficiencies that become more evident when a high number of processors are used. FIG. 8 illustrates how WPP processes rows of CTBs in parallel, each row starting with the CABAC probabilities available after processing the second CTB of the row above.

Figure 9:
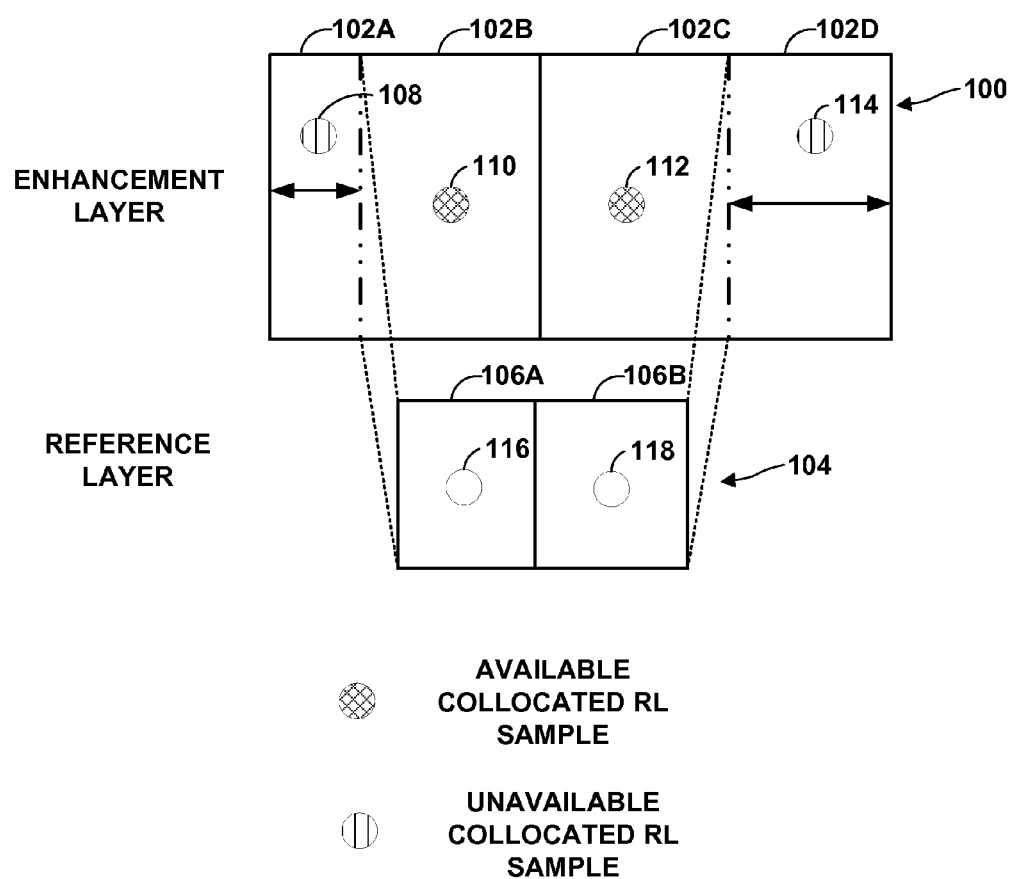
FIG. 9 is a conceptual diagram illustrating enhancement layer regions that do not have collocated reference layer regions.

FIG. 9 is a conceptual diagram illustrating an example enhancement layer picture 100 predicted from a reference layer picture 104. In this example, enhancement layer picture 100 includes tiles 102A-102D, while reference layer picture 104 includes tiles 106A, 106B. As shown by dashed lines in FIG. 9, tile 102B of enhancement layer picture 100 corresponds to tile 106A of reference layer picture 104, while tile 102C of enhancement layer picture 100 corresponds to tile 106B of reference layer picture 104.

In this example, enhancement layer picture 100 has a different aspect ratio than reference layer picture 104. For instance, reference layer picture 104 may have a 4:3 aspect ratio, whereas enhancement layer picture 100 may have a 16:9 aspect ratio. Thus, tiles 102A, 102D of enhancement layer picture 100 do not have corresponding tiles in reference layer picture 104. For example, tile 102A of enhancement layer picture 100 includes sample 108. As indicated by vertical hashing, sample 108 does not have an available, collocated reference layer (RL) sample in reference layer picture 104. Similarly, sample 114 of tile 102D of enhancement layer picture 100 does not have an available, collocated RL sample. Samples 110, 112, however, do have available, collocated reference layer samples in reference layer picture 104 (as indicated by cross-hatching). In particular, samples 110, 112, correspond to samples 116, 118 of reference layer picture 104.

FIG. 9 illustrates an example in which tile boundaries of tiles 102B, 102C may be said to be aligned with tile boundaries of tiles 106A, 106B. In some examples, tile boundaries may be said to be aligned when, for any two enhancement layer picture samples that lie within the same enhancement layer tile, the collocated reference layer samples, if available, shall lie within the corresponding reference layer tile and for any two reference layer picture samples that lie within the corresponding reference layer tile, the collocated enhancement layer samples, if available, shall lie within the corresponding enhancement layer tile. Because any two samples within tile 102B would correspond to collocated samples within tile 106A, and likewise, any two samples within tile 106A would correspond to collocated samples within tile 102B, boundaries of tile 102B may be said to be aligned with boundaries of tile 106A. Similarly, because any two samples within tile 102C would correspond to collocated samples within tile 106B, and likewise, any two samples within tile 106C would correspond to collocated samples within tile 102C, boundaries of tile 102C may be said to be aligned with boundaries of tile 106B.

Tile boundary alignment may impact the manner in which a video coder (such as video encoder 20 or video decoder 30) codes a picture (or tile). For example, in some instances, the video coder may restrict inter-layer prediction or certain filtering operations in instances in which tile boundaries are not aligned.

According to aspects of this disclosure, an indication of whether tile boundaries are aligned may be provided in a VPS. For example, one or more syntax elements may be included in a VPS that indicate whether tiles of the layers referring to the VPS are aligned with another. For example, the syntax element tile_boundaries_aligned_flag[i][j] equal to 1 may indicate that, when any two samples of one picture of the i-th layer specified by the VPS belong to one tile, the two collocated samples, when both present in the picture of the j-th direct reference layer of the i-th layer, belong to one tile, and when any two samples of one picture of the i-th layer belong to different tiles, the two collocated samples, when both present in the picture of the j-th direct reference layer of the i-th layer belong to different tiles. The syntax element tile_boundaries_aligned_flag equal to 0 indicates that such a restriction may or may not apply. When not present, the value of tile_boundaries_aligned_flag[i][j] is inferred to be equal to 0.

In some examples, the tile boundary alignment information may be provided in the manner shown in Table 5 above. In such examples, video decoder 30 may determine whether each direct reference layer (e.g., as indicated by a direct dependency flag) has tile boundaries that are aligned with the tiles of the current layer.

In this manner, a video encoder (such as video encoder 20) may encode data that indicates whether tile boundaries are aligned between at least two of the layers of the multi-layer bitstream in a VPS. Likewise, a video decoder (such as video decoder 30) may decode, from a VPS, data that indicates whether tile boundaries are aligned between at least two of the layers of a multi-layer bitstream.

Figure 10:
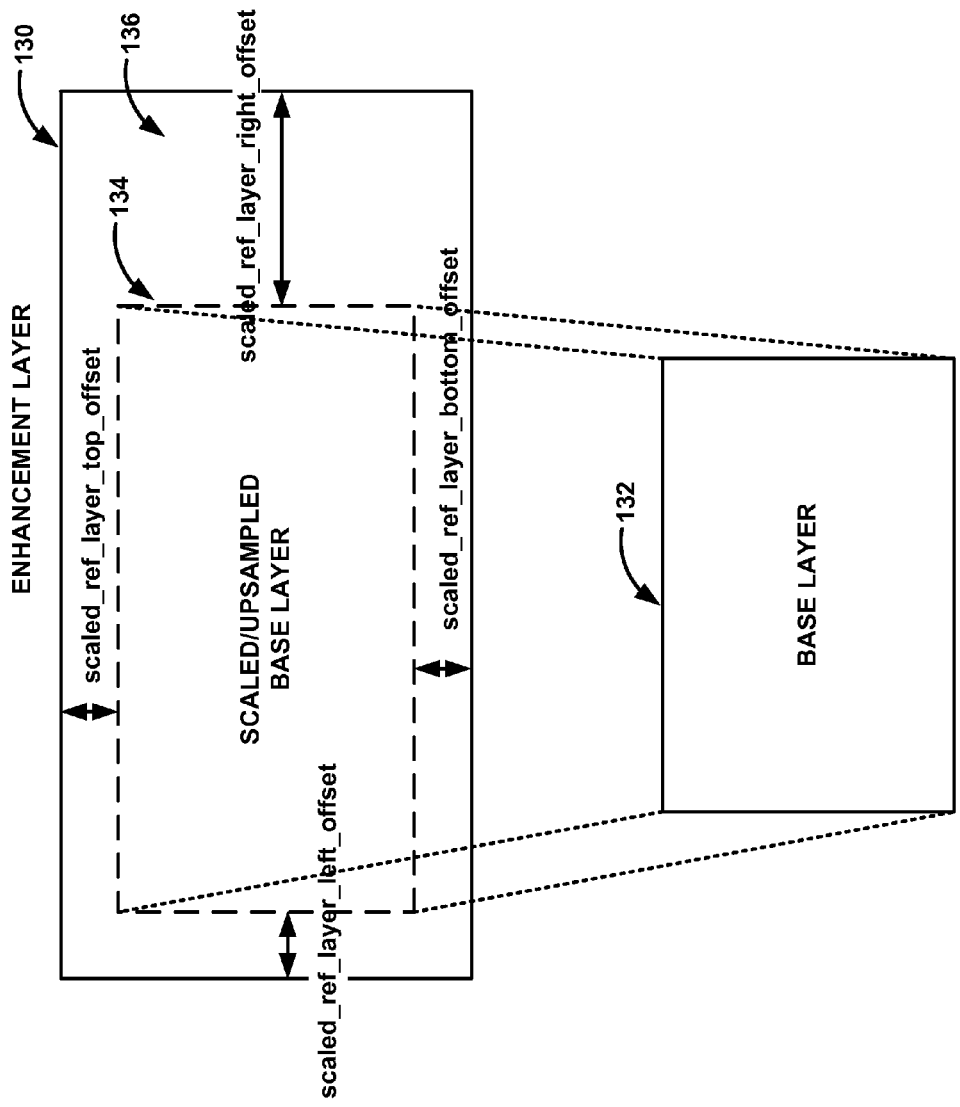
FIG. 10 is another conceptual diagram illustrating enhancement layer regions that do not have collocated reference layer regions.

FIG. 10 is a conceptual diagram illustrating enhancement layer regions that do not have collocated reference layer regions. The example of FIG. 10 includes an enhancement layer 130 and a base layer 132. Base layer 132 may be used as in inter-layer reference (reference layer) for coding enhancement layer 130. A scaled/upsampled version of base layer 132 is illustrated within enhancement layer 130 by dashed line 134.

As shown in the example of FIG. 10, enhancement layer 134 also includes a region 136 that is not included in base layer 134. Region 136 generally includes the area between scaled/upsampled base layer 134 and the boundary of enhancement layer 130, as indicated by the scaled offset values scaled_ref_layer_left_offset, scaled_ref_layer_top_offset, scaled_ref_layer_right_offset, and scaled_ref_layer_bottom_offset. That is, the value of the syntax element scaled_ref_layer_left_offset indicates a difference in location between a left edge of enhancement layer 130 and a left edge of scaled/upsampled base layer 134. Likewise, scaled_ref_layer_top_offset indicates a difference in location between a top edge of enhancement layer 130 and a top edge of scaled/upsampled base layer 134, scaled_ref_layer_right_offset indicates a difference in location between a right edge of enhancement layer 130 and a right edge of scaled/upsampled base layer 134, and the value of the syntax element scaled_ref_layer_bottom_offset indicates a difference in location between a bottom edge of enhancement layer 130 and a bottom edge of scaled/upsampled base layer 134. In some instances, the area between scaled/upsampled base layer 134 and the boundary of the enhancement layer 130 indicated by the offsets may include text or other screen content (e.g., not video data).

According to aspects of this disclosure, a video coder (such as video encoder 20 and/or video decoder 30) may determine a location of a collocated sample (e.g., a reference sample). The video coder may also determine the location of a collocated CTU based on the determined collocated sample. The collocated CTU may be used for purposes of inter-layer prediction between enhancement layer 130 and base layer 132 (e.g., where base layer 132 is a reference layer).

In an example for purposes of illustration, the video coder may determine the variables xRef[i] and yRef[i] for a collocated sample of the i-th direct reference layer according to the following equations:

$$xRef[i]=((xP-\text{ScaledRefLayerLeftOffset})*\text{ScaleFactor}X+(1<<15))>>16$$

$$yRef[i]=((yP-\text{ScaledRefLayerTopOffset})*\text{ScaleFactor}Y+(1<<15))>>16$$

where xRef[i] represents an x-coordinate of the collocated sample and yRef[i] represents a y-coordinate of the collocated sample. In addition, xP and yP may be sample locations in in a picture P relative to a top left sample of the picture, the value of the syntax element ScaledRefLayerLeftOffset may be an indication of a distance between the left edge of enhancement layer 130 and the left edge of scaled/upsampled base layer 134, and the value of the syntax element ScaledRefLayerTopOffset may be an indication of a distance between the right edge of enhancement layer 130 and the right edge of scaled/upsampled base layer 134. In addition, ScaleFactorX and ScaleFactorY (scaling factors based on the size of the reference picture and the scaled reference picture) may be determined based on the difference in scale between enhancement layer 130 and base layer 132 according to section G.8.1.4 of the SHVC document noted above (JCTVC-M1007).

In the example above, according to aspects of this disclosure, the video coder adjusts the collocated sample xRef, yRef based on the offset values. For example, the video coder may determine the location of a reference sample based on scaled offsets indicating a difference in scale between two layers. Hence, rather than mapping a sample of enhancement layer 130 directly to a corresponding location in base layer 132, the video coder may account for the relative difference in location due to the differences in scale and offsets.

After determining the location of the collocated sample, the video coder may determine the location of the collocated CTU. In some instances, the video coder may separately determine the location of the respective collocated CTBs (luma and chroma CTBs) of a given CTU. In an example for purposes of illustration, according to aspects of this disclosure, the video coder may determine the location of a collocated CTU based on the following equations:

$$xColCtb=xRef>>\text{refCtbLog2Size}Y[i],$$

$$yColCtb=yRef>>\text{refCtbLog2Size}Y[i],$$

$$colCtbAddr[i]=xColCtb[i]+(yColCtb[i]*\text{refPicWidthInCtbs}Y[i])$$

where xColCtb represents an x-component of a CTU (e.g., the luma CTB or one of the chroma CTBs of the CTU), xRef represents an x-coordinate of the collocated sample, yColCtb represents an y-component of the collocated CTU, yRef represents an y-coordinate of the collocated sample, and colCtbAddr[i] represents the address of the collocated CTU. In addition, the variables refCtbLog2SizeY[i][j], refPicWidthInCtbsY[i][j], and refPicHeightInCtbsY[i][j] may be set equal to CtbLog2SizeY, PicWidthInCtbsY, and PicHeightInCtbsY, respectively, of the j-th direct reference layer of the i-th layer. Accordingly, the variable colCtbAddr[i] denotes the raster scan address of the collocated CTU, in a picture in the i-th direct reference layer, of the CTU with raster scan address equal to ctbAddr.

According to aspects of this disclosure, the collocated CTU may only be used if the collocated CTU is located in an area that satisfies offset delays. For example, as noted above, the syntax elements min_spatial_segment_offset_plus1 and min_horizontal_ctu_offset_plus1 may be used to indicate a decoding delay of the current layer. However, when extended spatial scalability is used, it is possible that for a spatial segment A (slice, tile, CTU row or CTU) in the current layer, the collocated spatial segment B may not be present in a direct reference layer. For example, as shown in the example of FIG. 10, a collocated spatial segment of a spatial segment included in enhancement layer 130 may not be included in base layer 132 (e.g., the spatial segment may be included in area 136, which does not have a corresponding area in base layer 132). In such an example, the offset delay may not be accurately determined.

According to aspects of this disclosure, when the collocated CTU in a reference layer is not present for a particular CTU in the current layer, a video coder (such as video encoder 20 and/or video decoder 30) may adjust the values of the CTU addresses (the x- and y-components) to the corresponding reference layer boundary such that the adjusted address corresponds to a CTU that is present in the reference layer. In the example of FIG. 10, the video coder may adjust the addresses such that the collocated CTU corresponds to a CTU within the boundary of base layer 132.

In an example for purposes of illustration, the video coder may apply a clipping function to adjust the address of a collocated sample prior to determining the collcoated CTU. For example, the video coder may apply the equations below:

$$xRef[i]=Clip3(leftStart_C, rightEnd_C-1, xRef[i]),$$

$$yRef[i]=Clip3(topStart_C, bottomEnd_C-1, yRef[i])$$

where xRef[i] represents the x-coordinate of the collocated sample, yRef[i] represents the y-coordinate of the collocated sample. In some examples, the video coder may determine the variables leftStart$_C$, rightEnd$_C$, topStart$_C$, and bottomEnd$_C$ (where the subscript C represents chroma samples) based on the equations below:

$$leftStartC=ScaledRefLayerLeftOffset/SubWidthC$$

$$rightEndC=(PicWidthInSamplesL-ScaledRefLayerRightOffset)/SubWidthC$$

$$topStartC=ScaledRefLayerTopOffset/SubHeightC$$

$$bottomEndC=(PicHeightInSamplesL-ScaledRefLayerBottomOffset)/SubHeightC$$

with the scaled offsets (e.g., ScaledRefLayerOffset) corresponding to the offsets shown in the example of FIG. 10. While the example above is illustrated for chroma samples, the video coder may apply similar equations for the luma CTB.

In the example above, the video coder adjusts the offsets to the relative boundaries of the reference picture when the reference sample is located outside of the reference picture; otherwise the video coder does not adjust the location of the reference sample. For example, when a horizontal location of the reference sample is located to the left of a left reference picture boundary, the video coder may replace the horizontal location with a location of the left reference picture boundary. Likewise, when the horizontal location of the reference sample is located to the right of a right reference picture boundary, the video coder may replace the horizontal location with a location of the right reference picture boundary. When a vertical location of the reference sample is located above a top reference picture boundary, the video coder may replace the vertical location with a location of the top reference picture boundary. When the vertical location of the reference sample is located below a bottom reference picture boundary, the video coder may replace the vertical location with a location of the bottom reference picture boundary.

By adjusting the location of the collocated sample based on the scaled offset values prior to locating the collocated CTU in base layer 130, the video coder may adjust the collocated CTU to be located within the boundary of base layer 130.

In this manner, if the offset delay indicates a spatial location that is not present in a reference layer (such as base layer 132), the video coder may still determine when to begin coding a current layer (such as enhancement layer 130). That is, by adjusting the collocated CTU to be located within the reference layer, the video coder may also adjust the offset delay to be located in a valid location of the reference layer.

In another example, when a CTU with address colCtbAddr is not present in the i-th direct reference layer, the video coder may infer the value of the syntax element min_spatial_segment_offsetplus1[i] for that spatial segment is inferred to be zero. In this example, the video coder may also apply a number of other changes relative to JCTVC-M0464. For example, when a ctu_based_offset_enabled[i] syntax element is equal to 0, the video coder may apply the following constraints: let CTU row A be any CTU row in any picture picA referring to the SPS and ctbAddr be the raster scan address of the last CTU in CTU row A; let CTU row B be the CTU row that is in the picture picB belonging to the same access unit as picA and belonging to the i-th direct reference layer and that contains the CTU with raster scan address colCtbAddr[i]; let CTU row C be the CTU row that is also in picB and follows CTU row B in decoding order, and between CTU row B and that CTU row there are min_spatial_segment_offset_plus1[i]−1 CTU rows in decoding order; when CTU row C is present, the syntax elements of CTU row A are constrained such that no sample or syntax elements values in CTU row C or row of the same picture following C are used for inter-layer prediction in the decoding process of any samples within CTU row A. In addition, when CTU row B is not present, the value of the syntax element min_spatial_segment_offset_plus1[i] for that spatial segment is inferred to be zero.

The video coder may apply the same constraints for other spatial segments like slices and tiles. For example, when slice segment B is not present, the value of the syntax element min_spatial_segment_offset_plus1[i] for that spatial segment may be inferred to be zero. As another example, when tile B is not present, the value of the syntax element min_spatial_segment_offset_plus1[i] for that spatial segment may be inferred to be zero.

Figure 11A:
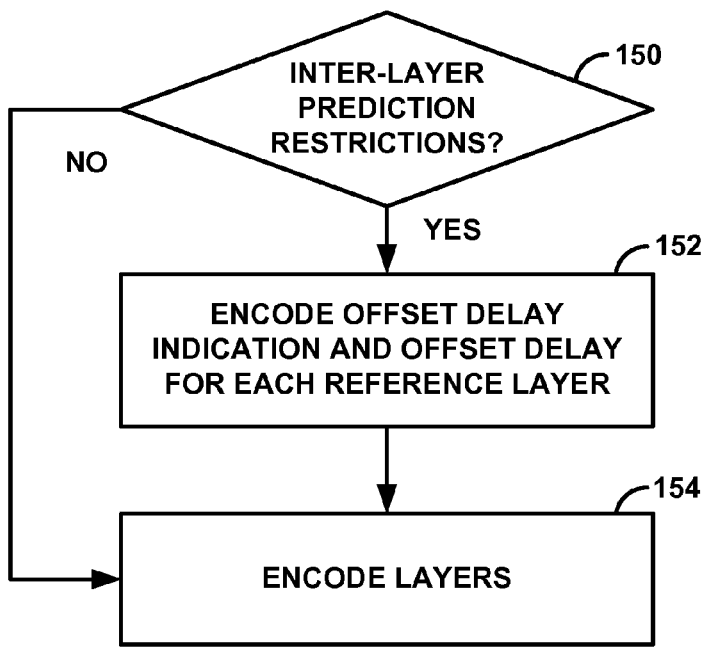
FIGS. 11A and 11B are flow diagrams illustrating an example process for determining offset delay information in multi-layer video coding.

FIG. 11A is a flow diagram illustrating an example process for encoding multi-layer video data including offset delay information for the video data. The process of FIG. 11A is generally described as being performed by video encoder 20 for purposes of illustration, although a variety of other processors may also carry out the process shown in FIG. 11A.

In the example of FIG. 11A, video encoder 20 may determine whether there are any inter-layer prediction restrictions for a multi-layer bitstream currently being encoded (150). For example, video encoder 20 may apply inter-layer prediction restrictions when encoding multiple layers that may be decoded in parallel. The particular offset delay parameters may depend on the particular architecture of video encoder 20 (e.g., the number of processing cores or the like).

If there are inter-layer restrictions ("YES" branch of 150), video encoder 20 may encode an offset delay indication and the offset delays for each reference layer (152). According to aspects of this disclosure, video encoder 20 may encode such information in a VPS. For example, video encoder 20 may encode data, in the VPS, indicating whether there are any inter-layer prediction restrictions. The data may, in some instances, include one or more syntax elements that indicate whether at least one reference layer has an associated offset delay. Video encoder 20 may also encode data indicating the offset delay (e.g., the spatial area of the offset delay) for each reference layer having a delay.

Video encoder 20 may then encode the layers in accordance with the data of the VPS (154). In some instances, video encoder 20 may encode the layers in parallel.

Figure 11B:
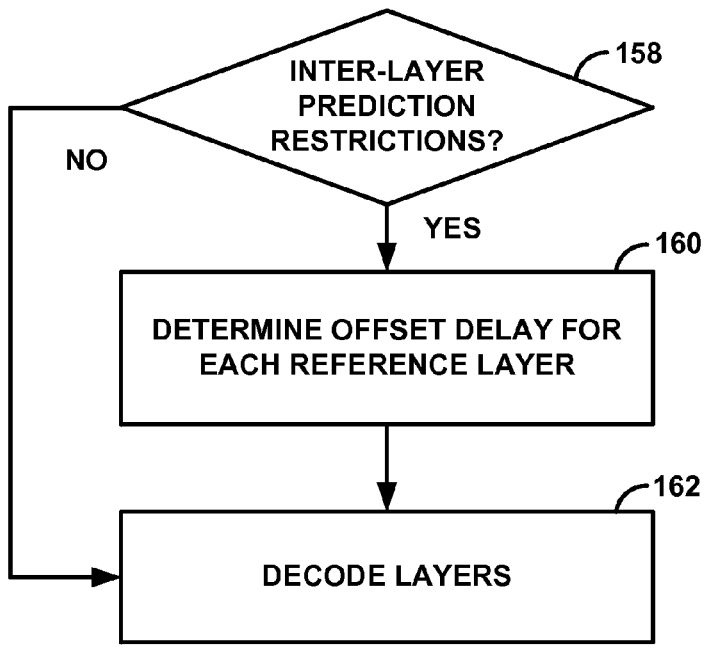

FIG. 11B is a flow diagram illustrating an example process for decoding multi-layer video data including offset delay information for the video data. The process of FIG. 11B is generally described as being performed by video decoder 30 for purposes of illustration, although a variety of other processors may also carry out the process shown in FIG. 11B.

In the example of FIG. 11B, video decoder 30 may determine whether there are any inter-layer prediction restrictions for a multi-layer bitstream currently being encoded (158). For example, video decoder 30 may determine whether any direct reference layer for a current layer (where the direct reference layer is referred to by the current layer for purposes of inter-layer prediction) have an associated offset delay. According to aspects of this disclosure, video decoder 30 may make the inter-layer prediction restriction determination based on data included in a VPS. The data may, in some instances, include one or more syntax elements that indicate whether at least one reference layer has an associated offset delay. Video decoder 30 may also decode data indicating the offset delay (e.g., the spatial area of the offset delay) for each reference layer having a delay.

Video decoder 30 may then decode the layers in accordance with the data of the VPS (162). For example, in some instances, video decoder 30 may decode one layer relative to another layer. In addition, video decoder 30 may adhere to the determined offset parameters (as specified in the VPS described above) when decoding multiple layers in parallel. That is, video decoder 30 may wait to decode a current layer until the specified amount of video data from a reference layer (as specified by the offset delay) has been decoded.

Figure 12:
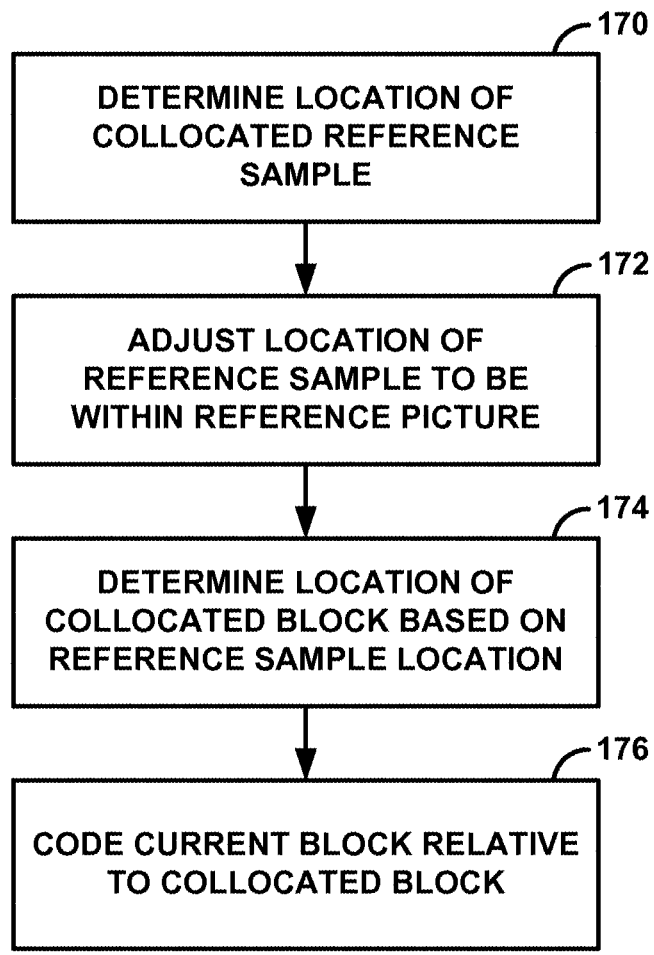
FIG. 12 is a flow diagram illustrating an example process for determining a collocated block of video data in multi-layer video coding.

FIG. 12 is a flow diagram illustrating an example process for determining a collocated block of video data in multi-layer video coding. The collocated block may be used for purposes of inter-layer prediction and may be determined when implementing an offset delay. The method of FIG. 12 is generally described as being performed by a video coder. The video coder may correspond to, for example, video encoder 20 or video decoder 30, or other such video coding devices (e.g., video transcoding devices).

In the example of FIG. 12, the video coder may determine a location of a collocated reference sample (170). For example, in multi-layer video coding, the video coder may initially determine a location of a sample in a layer currently being coded. The video coder may then map the location of the sample to a corresponding collocated location in a reference layer.

The video coder may adjust the location of the reference sample to be located within the reference picture (172). For example, in some instances, a block in a current picture (e.g., a current CTU) may not have a corresponding block in a reference picture (e.g., a collocated CTU), e.g., as shown in the examples of FIGS. 9 and 10. If the collocated block is not available in the reference picture, in some examples, the video coder may not apply an offset delay associated with the reference layer appropriately. For example, the video coder may implement an offset delay by locating a spatial segment indicated by the delay in a current layer and mapping the spatial segment to a collocated position in the reference layer. If the collocated spatial segment is not available, the video coder may not be able to properly implement the offset delay.

According to aspects of this disclosure, the video coder may adjust the location of the reference sample by determining a location of the sample that is within the area of the reference picture. For example, scaled offset values associated with the current picture (as shown, for example, in FIG. 10) may indicate the boundaries of the reference picture. The video coder may adjust the location of the collocated sample to be within these boundaries. In some examples, according to aspects of this disclosure, the video coder may clip the location of the reference sample such that the reference sample is within the reference picture, e.g., using a clipping function. If the reference sample is already included in the boundary of the reference picture, the video coder may not perform the adjustment described above.

The video coder may then determine the location of a collocated block based on the reference sample (174). For example, the video coder may determine a size of the collocated block and locate that appropriately sized block at the location of the reference sample. In some examples, the video coder may determine the collocated block when applying an offset delay for inter-layer prediction. The video coder may code the current block relative to the collocated block (176).

Figure 13:
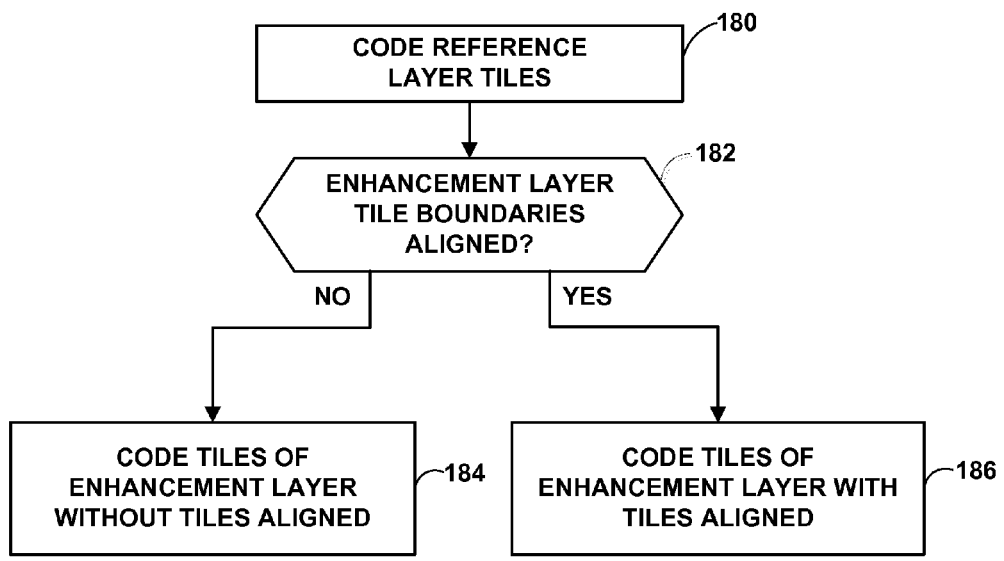
FIG. 13 is a flow diagram illustrating an example process for determining tile alignment information in multi-layer video coding.

FIG. 13 is a flow diagram illustrating an example process for determining tile alignment information in multi-layer video coding. The method of FIG. 13 is generally described as being performed by a video coder. The video coder may correspond to, for example, video encoder 20 or video decoder 30, or other such video coding devices (e.g., video transcoding devices).

In this example, the video coder codes one or more reference layer tiles (180). The video coder then determines whether tile boundaries of the enhancement layer are aligned (182). For example, video encoder 20 may determine whether to align reference layer boundaries, and may encode a value for a syntax element indicating whether tile boundaries are aligned, such as the tile_boundaries_aligned_flag syntax element, whereas video decoder 30 may determine whether reference layer boundaries are aligned, e.g., based on a value of a syntax element, such as tile_boundaries_aligned_flag. Tile boundaries of the enhancement layer picture may be said to be aligned with tile boundaries of the reference layer picture when, for any two enhancement layer picture samples that lie within the same enhancement layer tile, the collocated reference layer samples, if available, also lie within the same reference layer tile and for any two reference layer picture samples that lie within the same reference layer tile, the collocated enhancement layer samples, if available, also lie within the same enhancement layer tile.

According to aspects of this disclosure, video encoder 20 may encode data indicating whether tile boundaries are aligned in a VPS. Likewise, video decoder 30 may decode data indicating whether tile boundaries are aligned from a VPS. The data indicating whether tile boundaries are aligned may not be layer specific, and may provide a cross-layer indication of whether tile boundaries are constrained to be aligned.

When the tile boundaries of the enhancement layer picture are not aligned with the tile boundaries of the reference layer picture ("NO" branch of 182), the video coder may code the video data accordingly (184). For example, the video coder may, in some instances, apply restrictions on inter-layer prediction, filtering, or the like. On the other hand, when the tile boundaries of the enhancement layer picture are aligned with the tile boundaries of the reference layer picture ("YES" branch of 182), the video coder may code the video data accordingly (186). For example, the video coder may use inter-layer prediction, filtering, or other techniques with tile boundaries aligned.

Certain aspects of this disclosure have been described with respect to the HEVC standard and extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining, by one or more processors, a location of a reference sample associated with a reference picture included in a first layer of video data of a multi-layer bitstream based on a location of a sample in a second layer of video data of the multi-layer bitstream that is different than the first layer and one or more scaled offset values, wherein the one or more scaled offset values indicate a difference in scale between the first layer and the second layer;

adjusting, by the one or more processors, the location of the reference sample to determine an adjusted location for the reference sample that is located within the reference picture;

after adjusting the location of the reference sample, determining, by the one or more processors, a location of a reference block of video data in the first layer based on the adjusted location of the reference sample; and decoding, by the one or more processors, a current block of video data in the second layer relative to reference data of the reference block in the first layer, wherein decoding the current block relative to the reference data comprises decoding residual data for the current block and reconstructing the current block based on a combination of the residual data and the reference data of the reference block.

2. The method of claim 1, wherein the reference block comprises a coding tree unit (CTU), such that determining the location of the reference block comprises determining a location of the CTU.

3. The method of claim 2, wherein determining the location of the CTU comprises determining a raster scan address of the CTU.

4. The method of claim 1, further comprising decoding the one or more scaled offset values from the multi-layer bitstream.

5. The method of claim 1, wherein adjusting the location of the reference sample comprises clipping a location of the reference sample based on the one or more scaled offset values.

6. The method of claim 5, wherein clipping the location of the reference sample comprises:
when a horizontal location of the reference sample is located to the left of a left reference picture boundary, replacing the horizontal location with a location of the left reference picture boundary;
when the horizontal location of the reference sample is located to the right of a right reference picture boundary, replacing the horizontal location with a location of the right reference picture boundary;
when a vertical location of the reference sample is located above a top reference picture boundary, replacing the vertical location with a location of the top reference picture boundary; and
when the vertical location of the reference sample is located below a bottom reference picture boundary, replacing the vertical location with a location of the bottom reference picture boundary.

7. The method of claim 1, further comprising:
decoding data indicating an offset delay for the first layer, wherein the offset delay indicates a minimum quantity of video data from the first layer that is to be decoded prior to decoding the second layer of the multi-layer bitstream; and
wherein determining the location of the reference block comprises adjusting the offset delay based on the determined location of the reference block.

8. A method of encoding video data, the method comprising:
determining, by one or more processors, a location of a reference sample associated with a reference picture included in a first layer of video data of a multi-layer bitstream based on a location of a sample in a second layer of video data of the multi-layer bitstream that is different than the first layer and one or more scaled offset values, wherein the one or more scaled offset values indicate a difference in scale between the first layer and the second layer;

adjusting, by the one or more processors, the location of the reference sample to determine an adjusted location for the reference sample that is located within the reference picture;

after adjusting the location of the reference sample, determining, by the one or more processors, a location of a reference block of video data in the first layer based on the adjusted location of the reference sample; and encoding, by one or more processors, a current block of video data in the second layer relative to reference data of the reference block in the first layer, wherein encoding the current block relative to the reference data comprises determining residual data for the current block based on a difference between the current block and the reference block and encoding the residual data in an encoded bitstream.

9. The method of claim 8, wherein the reference block comprises a coding tree unit (CTU), such that determining the location of the reference block comprises determining a location of the CTU.

10. The method of claim 9, wherein determining the location of the CTU comprises determining a raster scan address of the CTU.

11. The method of claim 8, further comprising encoding the one or more scaled offset values in the multi-layer bitstream.

12. The method of claim 8, wherein adjusting the location of the reference sample comprises clipping a location of the reference sample based on the one or more scaled offset values.

13. The method of claim 12, wherein clipping the location of the reference sample comprises:
when a horizontal location of the reference sample is located to the left of a left reference picture boundary, replacing the horizontal location with a location of the left reference picture boundary;
when the horizontal location of the reference sample is located to the right of a right reference picture boundary, replacing the horizontal location with a location of the right reference picture boundary;
when a vertical location of the reference sample is located above a top reference picture boundary, replacing the vertical location with a location of the top reference picture boundary; and
when the vertical location of the reference sample is located below a bottom reference picture boundary, replacing the vertical location with a location of the bottom reference picture boundary.

14. The method of claim 8, further comprising:
encoding data indicating an offset delay for the first layer, wherein the offset delay indicates a minimum quantity of video data from the first layer that is to be encoded prior to encoding the second layer of the multi-layer bitstream; and
wherein determining the location of the reference block comprises adjusting the offset delay based on the determined location of the reference block.

15. An apparatus that performs video decoding, the apparatus comprising:
a memory storing video data; and
a video decoder configured to:
determine a location of a reference sample associated with a reference picture included in a first layer of video data of a multi-layer bitstream based on a location of a sample in a second layer of video data of the multi-layer bitstream that is different than the first layer and one or more scaled offset values, wherein the one or more scaled offset values indicate a difference in scale between the first layer and the second layer;

adjust the location of the reference sample to determine an adjusted location for the reference sample that is located within the reference picture;

determine, after adjusting the location of the reference sample, a location of a reference block of video data in the first layer based on the adjusted location of the reference sample; and decode a current block of video data in the second layer relative to reference data of the reference block in the first layer, wherein to decode the current block relative to the reference data, the video decoder is configured to decode residual data for the current block and reconstruct the current block based on a combination of the residual data and the reference data of the reference block.

16. The apparatus of claim 15, wherein the reference block comprises a coding tree unit (CTU), such that to determine the location of the reference block, the video decoder is configured to determine a location of the CTU.

17. The apparatus of claim 16, wherein to determine the location of the CTU, the video decoder is configured to determine a raster scan address of the CTU.

18. The apparatus of claim 15, wherein the video decoder is further configured to decode the one or more scaled offset values in the multi-layer bitstream.

19. The apparatus of claim 15, wherein to adjust the location of the reference sample, the video decoder is configured to clip a location of the reference sample based on the one or more scaled offset values.

20. The apparatus of claim 19, wherein to clip the location of the reference sample, the video decoder is configured to:

when a horizontal location of the reference sample is located to the left of a left reference picture boundary, replace the horizontal location with a location of the left reference picture boundary;

when the horizontal location of the reference sample is located to the right of a right reference picture boundary, replace the horizontal location with a location of the right reference picture boundary;

when a vertical location of the reference sample is located above a top reference picture boundary, replace the vertical location with a location of the top reference picture boundary; and when the vertical location of the reference sample is located below a bottom reference picture boundary, replace the vertical location with a location of the bottom reference picture boundary.

21. The apparatus of claim 15, wherein the video decoder is further configured to:

decode data indicating an offset delay for the first layer, wherein the offset delay indicates a minimum quantity of video data from the first layer that is to be decoded prior to decoding the second layer of the multi-layer bitstream; and wherein to determine the location of the reference block, the one or more processors are configured to adjust the offset delay based on the determined location of the reference block.

22. The apparatus of claim 15, further comprising a display device configured to present the video data.

23. The apparatus of claim 15, further comprising a wireless modem configured to receive the video data.

24. An apparatus that performs video decoding, the apparatus comprising:

means for determining a location of a reference sample associated with a reference picture included in a first layer of video data of a multilayer bitstream based on a location of a sample in a second layer of video data of the multilayer bitstream that is different than the first layer and one or more scaled offset values, wherein the one or more scaled offset values indicate a difference in scale between the first layer and the second layer;

means for adjusting the location of the reference sample to determine an adjusted location for the reference sample that is located within the reference picture;

means for determining, after adjusting the location of the reference sample, a location of a reference block of video data in the first layer based on the adjusted location of the reference sample; and means for decoding a current block of video data in the second layer relative to reference data of the reference block in the first layer, wherein the means for decoding the current block relative to the reference data comprises means for decoding residual data for the current block and means for reconstructing the current block based on a combination of the residual data and the reference data of the reference block.

25. The apparatus of claim 24, wherein the reference block comprises a coding tree unit (CTU), such that the means for determining the location of the reference block comprises means for determining a location of the CTU.

26. The apparatus of claim 25, wherein the means for determining the location of the CTU comprises means for determining a raster scan address of the CTU.

27. The apparatus of claim 24, further comprising means for decoding the one or more scaled offset values in the multi-layer bitstream.

28. The apparatus of claim 24, wherein the means for adjusting the location of the reference sample comprises means for clipping a location of the reference sample based on the one or more scaled offset values.

29. The apparatus of claim 28, wherein the means for clipping the location of the reference sample comprises:

when a horizontal location of the reference sample is located to the left of a left reference picture boundary, means for replacing the horizontal location with a location of the left reference picture boundary;

when the horizontal location of the reference sample is located to the right of a right reference picture boundary, means for replacing the horizontal location with a location of the right reference picture boundary;

when a vertical location of the reference sample is located above a top reference picture boundary, means for replacing the vertical location with a location of the top reference picture boundary; and when the vertical location of the reference sample is located below a bottom reference picture boundary, means for replacing the vertical location with a location of the bottom reference picture boundary.

30. The apparatus of claim 24, further comprising:

means for decoding data indicating an offset delay for the first layer, wherein the offset delay indicates a minimum quantity of video data from the first layer that is to be decoded prior to decoding the second layer of the multi-layer bitstream; and wherein the means for determining the location of the reference block comprises means for adjusting the offset delay based on the determined location of the reference block.

31. A non-transitory computer-readable medium storing instructions thereon that, when executed, cause a video decoder to:
- determine a location of a reference sample associated with a reference picture included in a first layer of video data of a multilayer bitstream based on a location of a sample in a second layer of video data of the multilayer bitstream that is different than the first layer and one or more scaled offset values, wherein the one or more scaled offset values indicate a difference in scale between the first layer and the second layer;
- adjust the location of the reference sample to determine an adjusted location for the reference sample that is located within the reference picture;
- determine, after adjusting the location of the reference sample, a location of a reference block of video data in the first layer based on the adjusted location of the reference sample; and
- decode a current block of video data in the second layer relative to reference data of the reference block in the first layer, wherein to decode the current block relative to the reference data, the instructions cause the video decoder to decode residual data for the current block and reconstruct the current block based on a combination of the residual data and the reference data of the reference block.

32. The non-transitory computer-readable medium of claim 31, wherein the reference block comprises a coding tree unit (CTU), such that to determine the location of the reference block, the instructions cause the video decoder to determine a location of the CTU.

33. The non-transitory computer-readable medium of claim 32, wherein to determine the location of the CTU, the instructions cause the video decoder to determine a raster scan address of the CTU.

34. The non-transitory computer-readable medium of claim 31, wherein the instructions cause the video decoder to decode the one or more scaled offset values in the multi-layer bitstream.

35. The non-transitory computer-readable medium of claim 31, wherein to adjust the location of the reference sample, the instructions cause the video decoder to clip a location of the reference sample based on the one or more scaled offset values.

36. The non-transitory computer-readable medium of claim 35, wherein to clip the location of the reference sample, the instructions cause the video decoder to:
- when a horizontal location of the reference sample is located to the left of a left reference picture boundary, replace the horizontal location with a location of the left reference picture boundary;
- when the horizontal location of the reference sample is located to the right of a right reference picture boundary, replace the horizontal location with a location of the right reference picture boundary;
- when a vertical location of the reference sample is located above a top reference picture boundary, replace the vertical location with a location of the top reference picture boundary; and
- when the vertical location of the reference sample is located below a bottom reference picture boundary, replace the vertical location with a location of the bottom reference picture boundary.

37. The non-transitory computer-readable medium of claim 31, wherein the instructions further cause the video decoder to:
- decode data indicating an offset delay for the first layer, wherein the offset delay indicates a minimum quantity of video data from the first layer that is to be decoded prior to decoding the second layer of the multi-layer bitstream; and
- wherein to determine the location of the reference block, the instructions cause the one or more processors to adjust the offset delay based on the determined location of the reference block.

* * * * *